United States Patent
Kawasaki

(10) Patent No.: US 8,564,822 B2
(45) Date of Patent: Oct. 22, 2013

(54) PRINTING CONTROL APPARATUS FOR DETERMINING PRINT COMMANDS TO BE STORED WHEN PRINTING PLURAL COPIES OF A DOCUMENT

(75) Inventor: Keiji Kawasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1123 days.

(21) Appl. No.: 12/505,917

(22) Filed: Jul. 20, 2009

(65) Prior Publication Data
US 2010/0020356 A1 Jan. 28, 2010

(30) Foreign Application Priority Data
Jul. 28, 2008 (JP) ................................ 2008-193992

(51) Int. Cl.
*G06K 15/00* (2006.01)

(52) U.S. Cl.
USPC ......... 358/1.17; 358/1.16; 399/137; 399/402; 399/145; 399/362; 399/363; 399/381; 399/383

(58) Field of Classification Search
USPC ....................................................... 358/1.17
See application file for complete search history.

(56) References Cited

U.S. PATENT DOCUMENTS

| | | | | |
|---|---|---|---|---|
| 6,480,295 B1 * | 11/2002 | Taoda | ........................... | 358/1.16 |
| 6,832,187 B1 * | 12/2004 | Dow et al. | ....................... | 703/27 |
| 7,307,750 B2 * | 12/2007 | Kizaki | ........................... | 358/1.17 |
| 7,847,967 B2 * | 12/2010 | Ferlitsch | ........................ | 358/1.16 |
| 7,898,682 B2 * | 3/2011 | Matsuo | .......................... | 358/1.15 |
| 7,990,557 B2 * | 8/2011 | Tsunekawa | ................... | 358/1.15 |
| 8,130,394 B2 * | 3/2012 | Matsuda | ....................... | 358/1.15 |
| 8,223,359 B2 * | 7/2012 | Matsushima | ................ | 358/1.15 |
| 8,264,710 B2 * | 9/2012 | Burkes et al. | ................. | 358/1.15 |
| 8,310,713 B2 * | 11/2012 | Sugimoto et al. | ............ | 358/1.18 |
| 2004/0179211 A1 * | 9/2004 | Burkes et al. | ................. | 358/1.5 |
| 2004/0257618 A1 * | 12/2004 | Wang | ............................ | 358/1.17 |
| 2006/0133678 A1 * | 6/2006 | Yokota | .......................... | 382/239 |
| 2007/0058198 A1 * | 3/2007 | Moritani | ....................... | 358/1.16 |
| 2008/0117462 A1 * | 5/2008 | Gaebel | .......................... | 358/1.17 |
| 2008/0231885 A1 * | 9/2008 | Truong et al. | ................. | 358/1.15 |

FOREIGN PATENT DOCUMENTS

| | | | | |
|---|---|---|---|---|
| JP | 6-202822 | A | | 7/1994 |
| JP | 09-247377 | A1 | | 9/1997 |
| JP | 10-044524 | A | | 2/1998 |
| JP | 10044524 | A | * 2/1998 | ................ B41J 5/30 |
| JP | 2006-150978 | A | | 6/2006 |
| JP | 2006-172257 | A | | 6/2006 |

* cited by examiner

*Primary Examiner* — Benjamin O Dulaney
(74) *Attorney, Agent, or Firm* — Canon U.S.A., Inc. IP Division

(57) ABSTRACT

Print commands are saved in increments of pages, based on usable storage capacity, at the time of printing processing of a first copy, so that page spacing to save the print commands is as uniform as possible. At the time of printing processing of the second copy, the stored print commands are reused and transferred to a printer, and the print commands not stored are generated again. The transferring and generating of the print commands are performed in parallel.

17 Claims, 13 Drawing Sheets

FIG. 8

| PAPER TYPE | PRINTING QUALITY | GRAY SCALE ON/OFF | PRINTING TIME (sec) |
|---|---|---|---|
| PHOTOGRAPH PAPER 1 | 1 | ON | 100 |
| | | OFF | 120 |
| | 2 | ON | 60 |
| | | OFF | 80 |
| | 3 | ON | 30 |
| | | OFF | 40 |
| NORMAL PAPER 1 | 1 | ON | 20 |
| | | OFF | 30 |
| | 2 | ON | 18 |
| | | OFF | 25 |
| | 3 | ON | 15 |
| | | OFF | 20 |
| ⋮ | ⋮ | ⋮ | ⋮ |

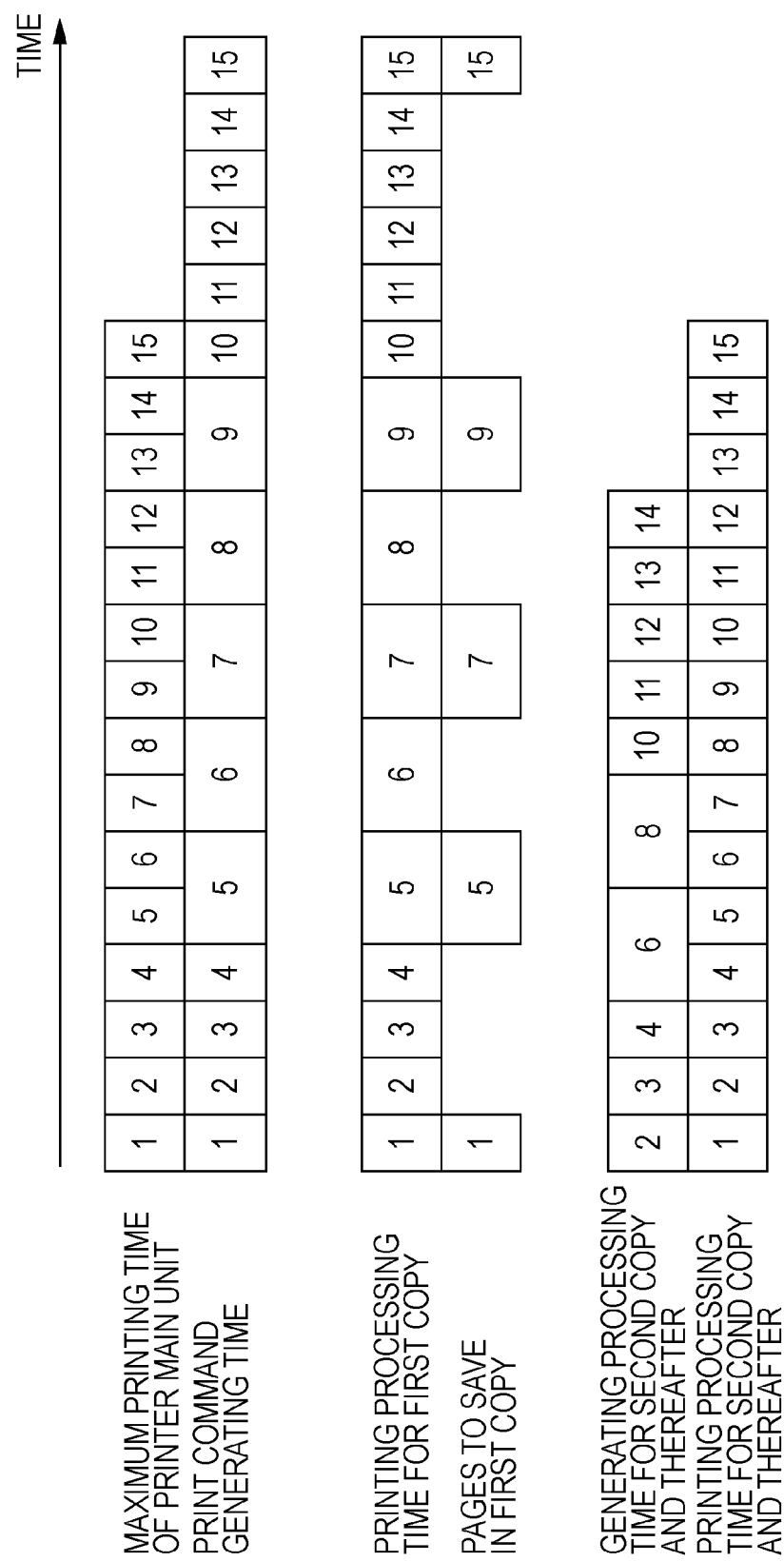

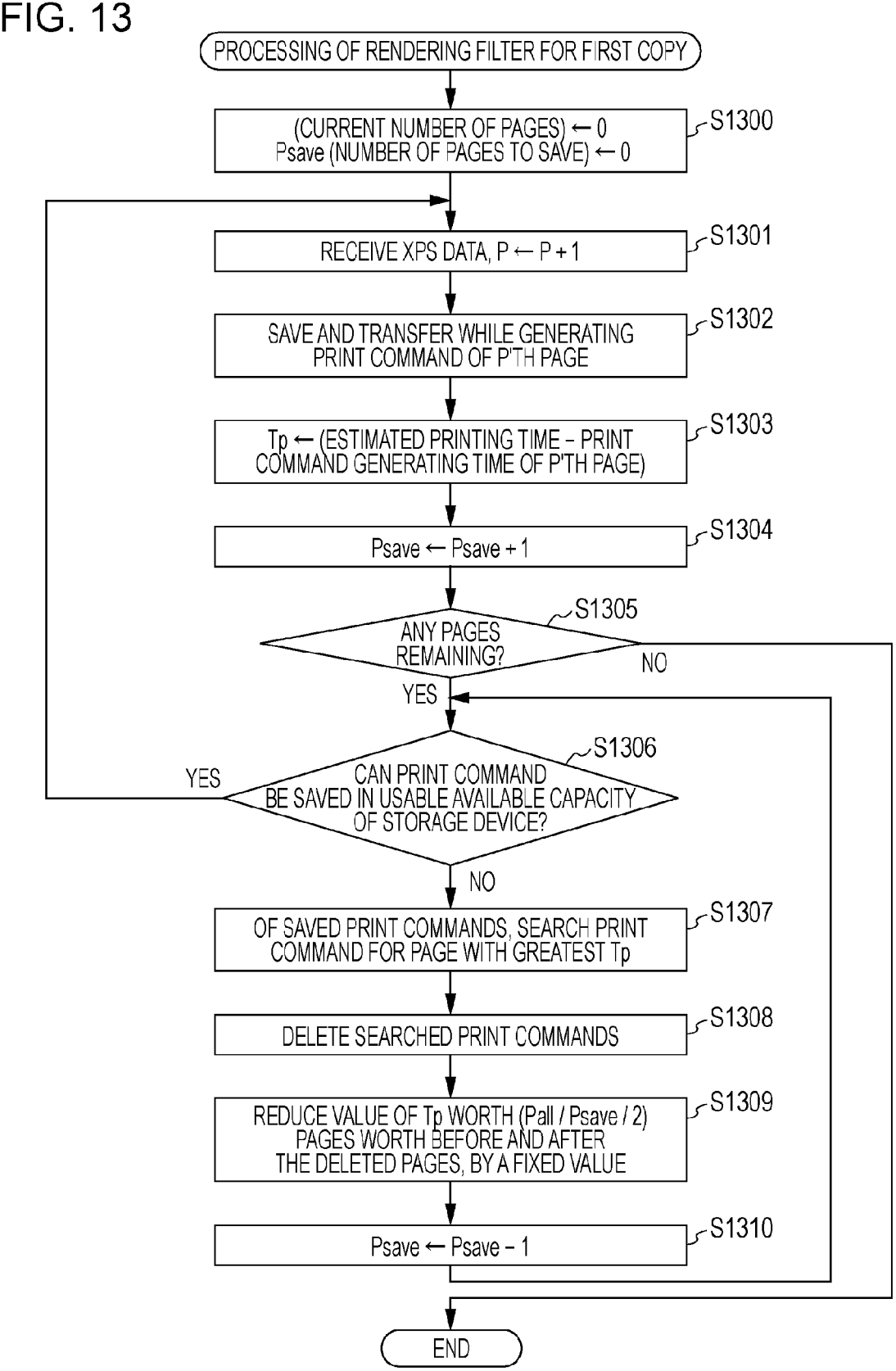

PRINTING CONTROL APPARATUS FOR DETERMINING PRINT COMMANDS TO BE STORED WHEN PRINTING PLURAL COPIES OF A DOCUMENT

BACKGROUND OF THE INVENTION

1. Field of the Invention

The present invention relates to a printing control technique in the event of performing printing of multiple copies.

2. Description of the Related Art

Heretofore, there has been a technique whereby, in the case that a printing request occurs which specifies printing multiple copies of the same page, printing data is generated that can be interpreted by the printer, the generated printing data is saved in a storage device such as a hard disk, and the already-generated printing data is referenced for the second copy and thereafter. Thus, performing processing to generate the printing data again is not required in the case of printing the same page, and the processing of the second copy and thereafter can be performed at high speed. Generally, as methods to perform printing of multiple copies, there are a method to continuously output multiple copies of each page, and a method to output with collating copies. With the method to continuously output multiple copies of each page, for example in the case of printing two copies of three pages, printing for each page is performed in the sequence of 1, 1, 2, 2, 3, 3. On the other hand, with the method to output with collating copies, for example in the case of printing two copies of three pages, printing for each page is performed in the sequence of 1, 2, 3, 1, 2, 3.

In the case of performing the former printing of multiple copies, the printing of the same page is always continuous. Therefore, in the case of applying the method to save and reference the printing data, the printing data to be saved is one page worth at the most. On the other hand, in the case of performing the latter printing of multiple copies, in order to utilize the already-generated printing data for the printing of the second copy and thereafter, the printing data worth the number of pages in the job has to be saved. Accordingly, in the case that the number of pages in the job is large, there may be cases wherein all of the printing data cannot be stored in the storage device within the host computer or printer. To resolve this, there is a technique to save the printing data for the current page only in the case that determination is made that the data can be stored in the storage device (see Japanese Patent Laid-Open No. 6-202822).

SUMMARY OF THE INVENTION

However, with the above-described current technique, the printing data that cannot be stored in the storage device is generated again in the processing of the second copy and thereafter, the printing data stored in the storage device is transferred, these being sequentially performed in the same process. Accordingly, processing of the second copy and thereafter cannot be efficiently performed.

Also, with the above-described current technique, in the case of saving only the printing data that can be saved in the storage device, the printing data of the first half portion of the job is disproportionately distributed and saved, whereby the printing data is not necessarily saved efficiently. For example, in the case that a complicated page is in the latter half portion of the job, and the burden to generate the printing data in the latter half portion of the job is great, saving the printing data of the latter half portion of the job is more effective from the perspective of high speed and simplification of the processing in the second copy and thereafter.

The present invention is made with consideration for such problems, and enables efficient processing of the second copy and thereafter in the event of performing printing of multiple copies, as compared to current techniques.

A printing control method according to one aspect of the present invention is a method in a printing system which includes a storage device for supplying print commands used in printing with a printer based on a printing request to instruct a plurality of pages and a plurality of copies, the method including the steps of: generating print commands based on the printing request; obtaining estimated printing time of the page unit by the printer; measuring the generating time of the print commands of the page unit in the generating step; first determining the print commands to be stored in the storage device by using the estimated printing time obtained and the generating time; second determining print commands that differ from the print commands of the page determined in the first determining step as print commands of a page to be stored in the storage device; storing the print commands of the pages determined in the first and second determining step; and supplying the print commands to the printer, wherein generating of the print commands in the generating step and supplying the print commands to the printer in the supplying step are performed in parallel, and wherein, in printing process for a second one of the plurality of copies, the print commands of the page stored in the storage device are supplied to the printer without generating the print commands of the page in the generating step.

A printing control method according to another aspect of the present invention is a method in a printing system which includes a storage device for supplying print commands used in printing with a printer based on a printing request to instruct a plurality of pages and a plurality of copies, the method comprising the steps of: generating of print commands based on the printing request; supplying of the print commands as to the printer; first determining that the print commands of the pages delaying supply of the print commands in the supplying step by the processing of generating of the print commands in the generating step should be stored, in the case that the processing of generating of the print commands in the generating step and supply of the print commands in the supplying step are performed in parallel; second determining of print commands that differ from the print commands of the page determined in the first determining step, as print commands of a page to be stored; and storing of the print commands of the pages determined in the first and second determining step in the storage device; wherein, in printing process for a second one of the plurality of copies, the print commands of the page stored in the storage device are supplied to the printer without generating the print commands of the page in the generating step.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a diagram illustrating an example of a lookup table according to the second embodiment of the present invention.

FIG. 12 is a diagram describing a specific example of an outline of the operations of the printing system according to the third embodiment of the present invention.

FIG. 13 is a flowchart describing an example of processing of a first copy in the rendering filter in the event of performing printing with collating copies, according to a fourth embodiment of the present invention.

DESCRIPTION OF THE EMBODIMENTS

Figure 1:
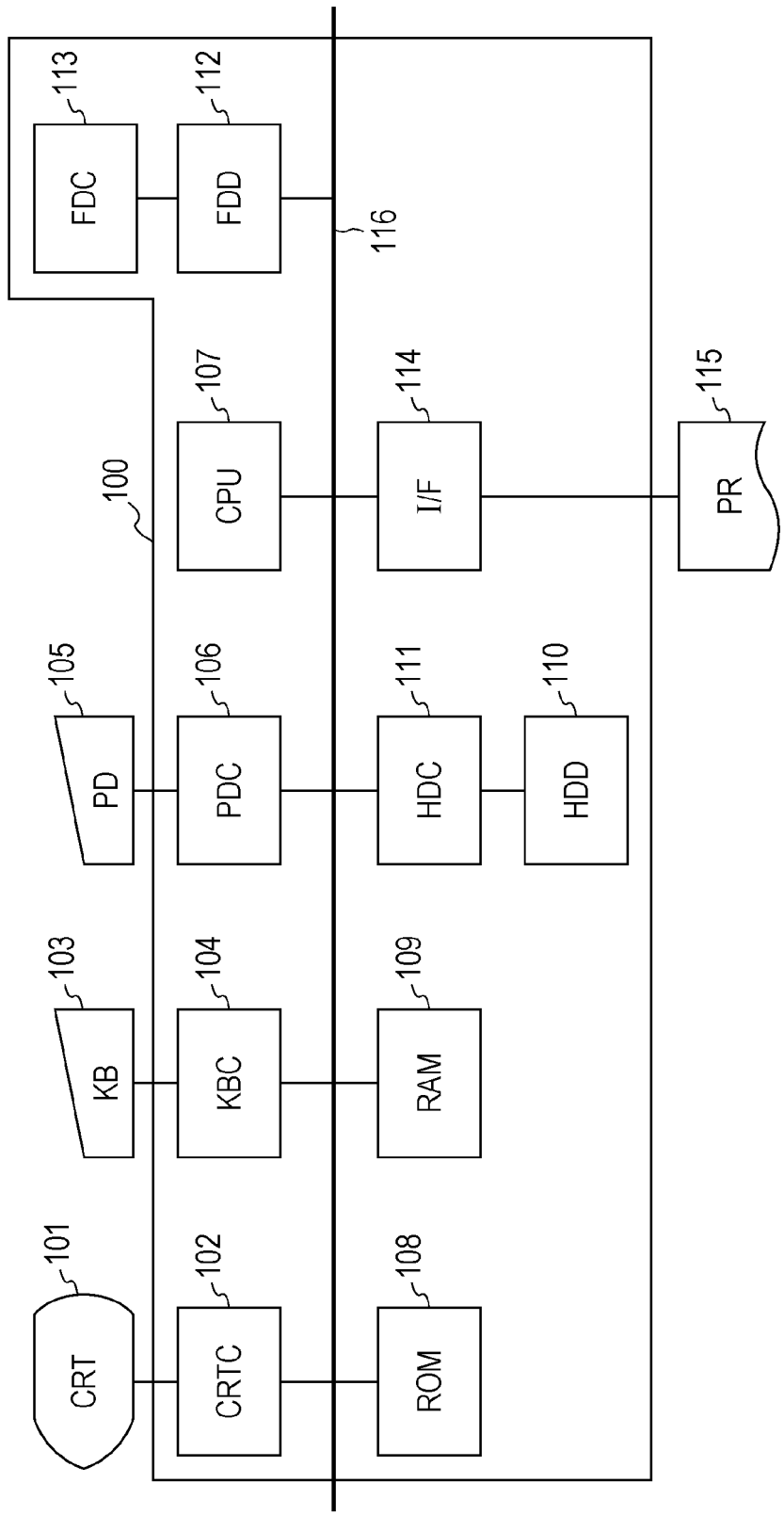
FIG. 1 is a block diagram illustrating an example of a hardware configuration of a printing system according to a first embodiment of the present invention.

Preferred embodiments of the present invention will be described below with reference to the diagrams.
First Embodiment FIG. 1 is a block diagram illustrating an example of a hardware configuration of a printing system. In FIG. 1, a CRT display apparatus 101 displays printing setting dialogs, printer status information and the like that is provided by a printer driver. A CRTC 102 is a controller for the display apparatus. A KB 103 is a data input apparatus such as a keyboard, and a KBC 104 is a keyboard controller. A PD 105 is a coordinate input apparatus such as a pointing device, and a PDC 106 is a pointing device controller. A CPT 107 controls the entire host computer apparatus 100.

ROM 108 has a boot program or the like stored therein. RAM 109 has an OS, various application programs, printer driver programs or the like stored therein, and is used as a work area also. An HDD 110 has an OS, various application programs, printer driver programs, font data or the like stored therein. Further the HDD 110 also temporarily stores spool files and so forth. An HDC 111 is a hard disk controller. An FDD 112 is a flexible disk drive which is a driving apparatus for a portable storage medium, and an FDC 113 is a flexible disk controller. An interface 114 is an interface, which is connected to a printer (PR) 115 such as an ink jet printer via an interface cable. A bus 116 mutually connects various devices.

Upon power being turned on to the host computer apparatus 100, the CPU 107 starts up according to the boot program stored in the ROM 108. The CPU 107 then loads the OS from the HDD 110, and is in a state awaiting user operation. In the case that instructions (printing instructions or print setting change instructions for the printer driver) are received from the user via an application from the KB 103 or PD 105, the printer driver program stored in the HDD 110 is loaded in the RAM 109 and executed. Also, in the case that the printer program is set to automatically start up, the printer driver program stored in the HDD 110 is loaded in the RAM 109 and executed, without instructions from the user.

Figure 2:
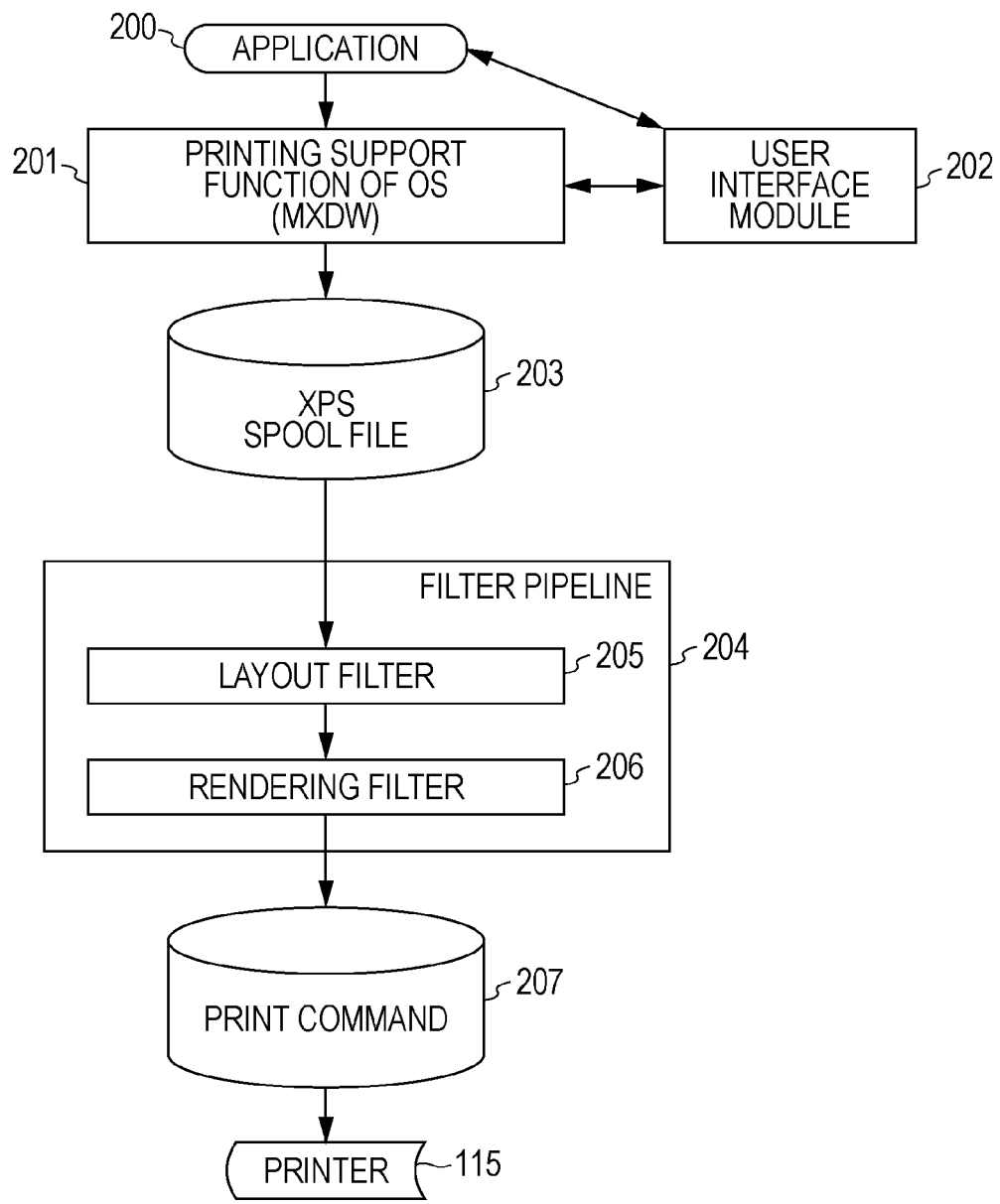
FIG. 2 is a diagram illustrating an example of a functional configuration of the printing system according to the first embodiment of the present invention.

FIG. 2 is a diagram illustrating an example of a functional configuration of the printing system. In FIG. 2, an example of the functions of the printing system is conceptually shown, primarily illustrating the OS printing support functions and printer driver. Note that hereafter, description will be made exemplifying a printing system wherein XML Paper Specification which is one of the open standard electronic document formats developed by Microsoft, Inc, as a spool file. Also, in the description below, XML Paper Specification will be referred to as "XPS" as appropriate, and a printer driver which uses XPS as a spool file will be referred to as "XPSDrv" as appropriate.

In FIG. 2, a filter pipeline 204 has layout filter 205 which includes a function that subjects the XPS data for each page to layout processing, and a rendering filter 206 which includes a function that converts XPS data into print commands that the printer 155 can interpret. In XPSDrv, the spool file is an XPS document wherein a picture is drown in increments of 96 dpi. Now, the term filter is generally a program which has a function to perform processing such as processing, converting, non-converting, generating and so forth based on the input data, and outputting some sort of data.

In the printing system in FIG. 2, the printing data for each page of the document created by the application 200 is temporarily stored as an XPS spool file 203 via an OS print support function (MXDW) 201. The filter pipeline 204 of the printer driver converts the printing data stored temporarily as the XPS spool file 203 into print commands that can be interpreted by the printer 115, and supplies this data to the printer 115. The printer 115 uses the supplied print commands to print.

A user interface module 202 generally provides a function to set paper size used for printing, the printing direction, and other attributes as printing setting items. The user interface module 202 returns the printing setting information (DEVMODE) wherein the setting values of multiple printing setting items are stored, to an application 200.

The application 200 creates a document. In the event of printing an arbitrary document that has been created, the application 200 notifies the MXDW 201 of printing starting and printing ending. Also, the application 200 notifies the MXDW 201 of the printing setting information returned from the user interface module 202 in order to perform printing settings, and notifies rendering starting and rendering ending for each page of the document. The MXDW 201 converts the content rendered by the application 200 and printing setting information into an XPS spool file 203, and stores this. Note that depending on the configuration of the application 200, the XPS spool file 203 can also be directly generated, rather than via the MXDW 201.

The filter pipeline 204 is configured with an arbitrary number of filters. The filter pipeline 204 reads out the printing setting information and printing data (XPS data) from the XPS spool file 203 at the time of printing. The filter pipeline 204 then converts the read information to print commands that the printer 115 can interpret and supplies this to the printer 115, and instructs execution of the printing.

The filters included in the filter pipeline 204 are called out from the filter pipeline 204 in the event of de-spooling the spooled print job. The spooled XPS data passes through the various filters of the filter pipeline 204 without change, the content thereof is edited or converted to a data format unique to the printer driver, and is finally converted to print commands that the printer 115 can interpret.

In the case that the XPS data of the print job has all finished being processed, or in the case that the print job is cancelled, the various filters of the filter pipeline 204 end the operations thereof.

As described above, the filter pipeline 204 according to the present embodiment has a layout filter 205 which is a layout processing unit and a rendering filter 206 which is a print command converting unit.

The layout filter 205 inputs the stored XPS data as an XPS spool file 203, and performs layout processing of the input XPS data (page), based on the printing setting information. The layout filter 205 then outputs XPS data that has already been laid out.

The rendering filter 206 inputs the XPS data output from the layout filter 205, and in accordance with the printing setting information converts the input XPS data to print commands that the printer 115 can interpret, and outputs this. According to the present embodiment, in the event of generating a print command, the rendering filter 206 converts the input XPS data once to image data. The rendering filter 206 converts the image data subjected to image processing such as color-space conversion and binarization into print commands that the printer 115 can interpret. A high function printer that is representative of a page printer may have XPS included in the types of print commands that the printer can interpret. In the case of using this type of printer, instead of a rendering filter 206, a filter is configured which edits the input XPS data and outputs the edited XPS data. Also, if editing the XPS data is not necessary, such a filter itself is unnecessary.

The printer 115 which is an output device interprets the print commands generated with the filter pipeline 204, and forms a visible image as to the printing paper.

With the XPSDrv shown in FIG. 2, processing is executed with the processes in the application 200 until the XPS spool file 203 is generated. The processing of the various filters executed with the filter pipeline 204 is executed with the processes of the filter pipeline 204. A print command 207 that the rendering filter 206 has transferred using an API (Application Program Interface) is temporarily saved in an external file in the processes of the filter pipeline 204. Subsequently, the print command 207 that has been requested for transfer from a different thread in the processes of the filter pipeline 204 is transmitted from the process of the spooler of the printing system to the printer 115.

Thus, with the printing system using XPSDrv, generating of the print command 207 and transferring to the printer 115 operate with difference processes. That is to say, the generating and transfer of the print command 207 can operate in parallel. For example, even if the printer 115 is during printing of an identified page, if generating of the print command 207 for the page thereof has been completed, the rendering filter 206 can start the generating processing of the print command 207 of the next page.

Also, with a printing system other than the XPSDrv, there are cases wherein the transfer processing of the print command 207 is not performed with a thread or process different from the print command 207 generating processing. As an example of such a printing system, there is a printing system that employs a graphics device interface (GDI) which is a rendering module from Microsoft, Inc. With this type of printing system, by explicitly providing a mechanism that performs the data generating and transferring with separate threads, a configuration can be realized which performs generating and transferring of the print command 207 in parallel. Hereafter, an embodiment will be described which presumes an XPSDrv printing system such as shown in FIG. 2, but even with another type of printing system, if the generating and transferring of the print command 207 can be performed in parallel, the operations below can be applicable.

Next, a specific example of basic operations in the case of performing the generating and transferring of the print command 207 in parallel will be described. As an example, let us say that the printing time for one page with the printer 115 is 10 seconds, and the generating time of the print command 207 for one page by the printer driver is 15 seconds. Also, let us say that the print command 207 for the first page has already been generated.

In the case that the generating and transferring of the print commands 207 are not operated in parallel, but are operated in the page unit, the generating processing for the second page cannot be performed during printing for the first page. Consequently, the print command 207 for the second page is generated along with the printing start of the second page. Therefore, the generating time of the print command 207 for the second page is 5 seconds short as to the printing time for the second page of the printer 115. On the other hand, in the case that the generating and transferring of the print commands 207 operate in parallel, the print command 207 for the second page can be generated during printing of the first page. Accordingly, if the generating of the print command 207 for the third page is started while the printing processing for the second page is halfway finished, the generating of the print command 207 for the third page is calculated as ending along with the end of the printing of the third page. Thus, in the case that the generating and transferring of the print commands 207 do not operate in parallel, the printer 115 can print all of the pages at 10 seconds each, only when the print commands 207 for all of the pages have been saved. Now, in the case that the generating and transferring of the print commands 207 operate in parallel, the printer 115 can print all of the pages at 10 seconds each, if the print commands 207 are finished generating at the rate of one page to three pages. Thus, in the case of performing high-speed printing processing using the already-generated print commands 207 of the pages for one copy, overall high-speed processing can be performed by operating the generating and transferring of the print commands 207 in parallel.

In the case of operating the generating and transferring of the print commands 207 in parallel, a storage device such as the HDD 110 that temporarily stores the already-generated print commands 207 is necessary. In the case that the size of the print commands 207 that operate the generating and transferring in parallel is small, the RAM 109 can be used as the temporary storage device. In the above-described example, let us further say that the entire number of pages is a job of 30 pages. As described above, in order to print all of the pages at maximum speed of the printer 115, the print commands 207 have to be generated beforehand at the rate of one page to three pages. In the case of generating the print commands 207 beforehand so as to be uniform as to the entire job, the pages to be generated beforehand are 1, 4, 7, and so forth. In this case, as described above, the print command 207 for the third page is begun to be created at the stage that the printing of the second page is halfway finished. From these operations, the capacity of a storage device required to operate the generating and transferring in parallel is the size that is one page worth of print commands 207. On the other hand, let us say that the print commands 207 are not generated beforehand uniformly as to the entire job, and the print commands 207 of the first 10 pages (1, 2, 3, etc.) are generated beforehand. In this case, seven pages worth of print commands 207 are roughly generated at the timing that the printing of the tenth page is finished (after 100 second from printing starting). Accordingly, in order to perform the generating and transferring of the print commands 207 in parallel and perform processing at a high speed, a storage device that can store a maximum of seven pages worth of print commands 207 is required. Thus, by generating the print commands 207 beforehand as uniformly as possible as to the entire job, the storage device required at time of parallel operation of the generating and transferring of the print commands 207 can be reduced.

Next, schematics of an example of multiple-copy printing will be described. Generally, as methods to perform printing of multiple copies, there are a method to continuously output multiple copies of each page, and a method to output with collating copies. With the description below, the multiple-copy printing method of the latter of these will be called printing with collating copies, as needed.

Figure 3:
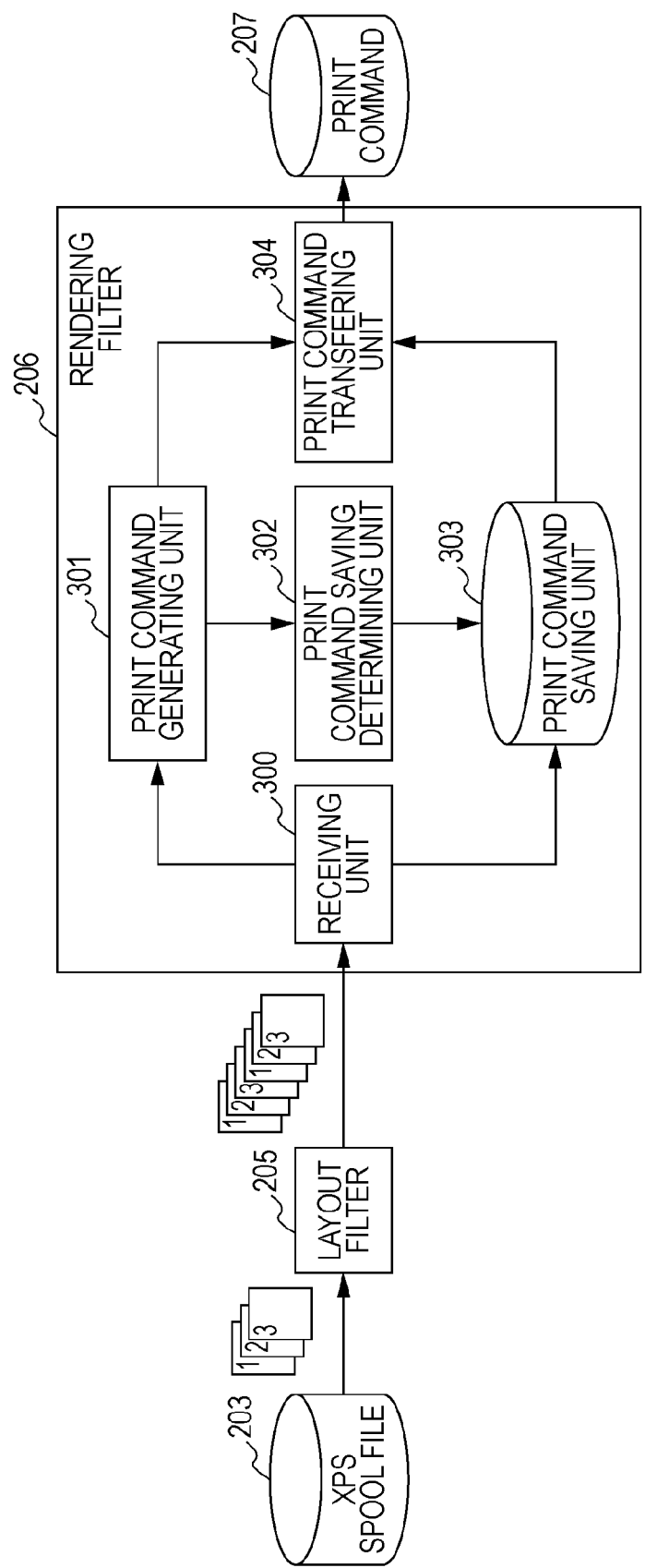
FIG. 3 is a diagram describing an example of the schematics of the operations of a layout filter and a rendering filter at the time of printing with collating copies, according to the first embodiment of the present invention.

FIG. 3 is a diagram describing an example of the schematics of the operations of the layout filter 205 and the rendering filter 206 at the time of printing with collating copies. The various filters called out from the filter pipeline 204 at least input an XPS spool file 203, and output print commands 207 that the printer 115 can interpret. This much has been described above. Now, description will be given using an example of a case wherein two copies of a three-page job is specified from the application 200.

As shown in FIG. 3, with the layout filter 205, each page of the XPS data is copied, and the XPS data of each page is handed to the rendering filter 206 multiple times. The rendering filter 206 receives the XPS data of each copied page with a receiving unit 300. A print command generating unit 301 references each page of the XPS data received by the receiving unit 300, and generates a print command 207. A print command transferring unit 304 outputs the print command 207 generated by the print command generating unit 301, employing an API of the OS. As described above, the print command 207 output from the print command transferring unit 304 is saved in a storage device as an external file, and is transmitted to the printer 115 from a process which differs from the process that generates the print command 207. Thus, the processing of the print command transferring unit 304 is normally completed instantly, regardless of the processing state of the printer 115, and can start processing to generate the print commands 207 of the next page and thereafter.

Thus, multiple copies of printing can be performed by sequentially converting the XPS data for each page copied with the layout filter 205 into print commands 207 with the rendering filter 206. However, with this configuration, the same print command 207 is repeatedly generated for the specified number of copies worth. Thus, according to the present embodiment, the print command 207 that has been generated once by the print command generating unit 301 is efficiently saved, and the saved print command 207 is reused in the case of printing the same page.

The print command 207 is saved in a storage device such as the HDD 110 in the form of an external file. However, since there is a limit to the savable regions in the HDD 110, in the case that the HDD 110 is used until immediately prior to there not being any free space, the temporary storage device for the OS and other applications is lost, whereby the operation thereof can become unstable. In the case of multiple-copy printing which is not printing with collating copies, the same page always continuously prints, whereby the capacity for the print command 207 to be saved in order to use for the second copy and thereafter is the capacity of one page worth. On the other hand, in the case of printing with collating copies, the print command 207 for all pages of the job needs to be saved in the HDD 110. There may be cases that the print request to the printer 115 extends to several hundred copies, and the print command 207 for all pages cannot necessarily be saved in a storage device such as the HDD 110.

Thus, with the embodiments below, a print command saving determining unit 302 within the rendering filter 206 determines whether or not the print command 207 for the identified page will be saved. In just the cases of determining to save, the print command 207 is saved in the print command saving unit 303. Details of an example of processing primarily by a print command saving determining unit 302 that performs a first determination and second determination will be described later. In the event of printing the second copy and thereafter, in the case that the relevant print command 207 is saved in the print command saving unit 303, generating of the print command 207 is omitted, and the print command transferring unit 304 transfers the saved print command 207 without change.

Note that the processing of each filter in FIG. 3 is limited to necessary processing in the event of performing printing with collating copies, but the filters perform other processing as well. For example, the layout filter 205 also performs layout processing such as for pages, according to the printing request. Also, unlike the configuration in FIG. 3, instead of creating a copy of each page of XPS data with the layout filter 205, a configuration may be made wherein XPS data is created just for pages wherein the print command 207 has not been saved by the rendering filter 206.

Figure 4:
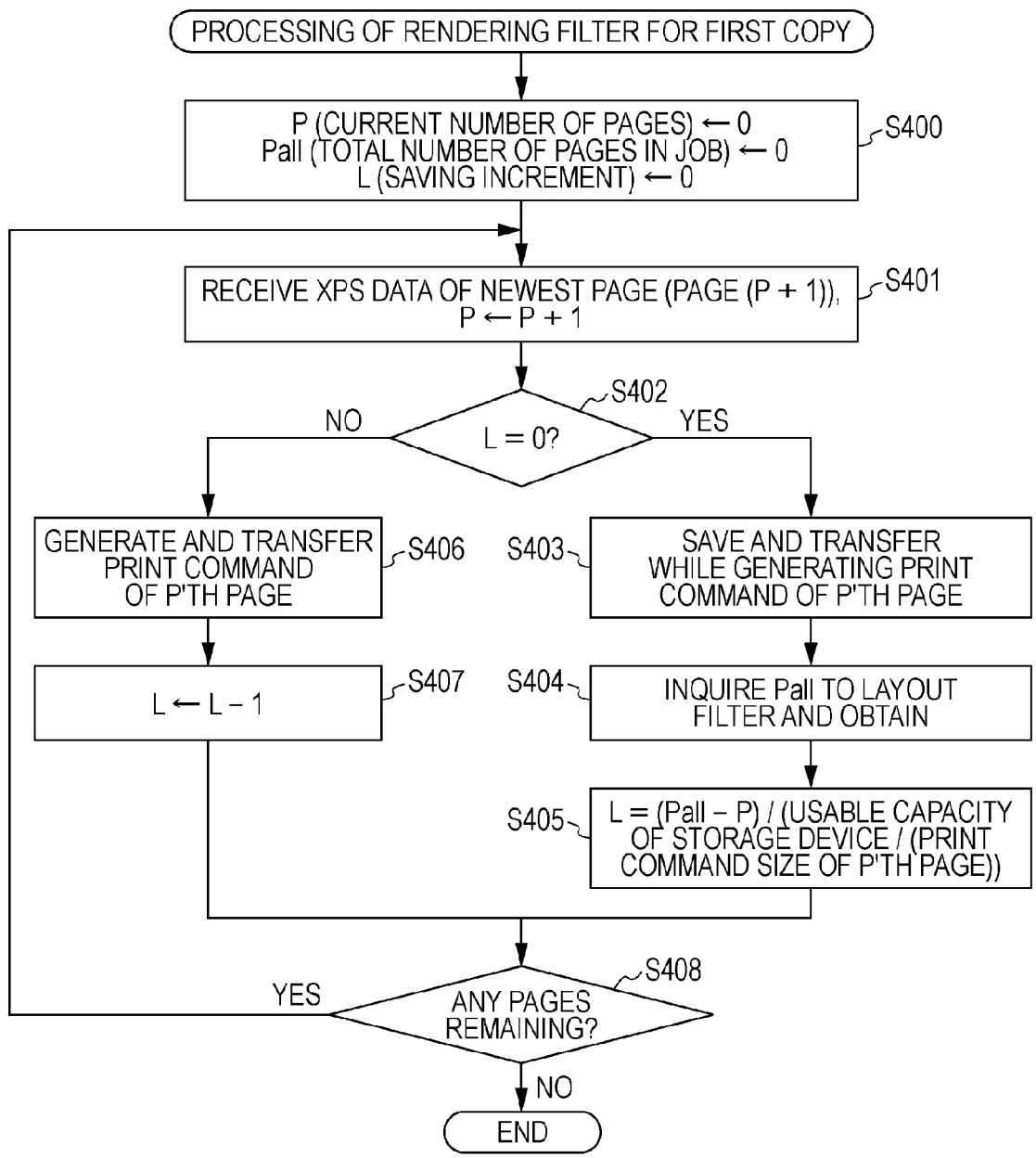
FIG. 4 is a flowchart describing an example of processing of a first copy in the rendering filter in the event of performing printing with collating copies, according to the first embodiment of the present invention.

FIG. 4 is a flowchart describing an example of processing for the first copy with the rendering filter 206 in the event of performing printing with collating copies.

First, the rendering filter 206 initializes P (current number of pages), Pall (total number of pages in job), and L (page spacing to save the print commands 207) to 0 (step S400). These parameters are stored in the RAM 109, for example.

Next, upon receiving the XPS data for page (P+1), the receiving unit 300 adds 1 to P which is the current number of pages) (step S401).

Next, the print command saving determining unit 302 determines whether or not the page spacing L to save the print commands 207 is 0 (step S402). As a result of this determination, in the case that the page spacing L to save the print commands 207 is 0, the print command generating unit 301 generates the print command 207 of the current page while saving to the print command saving unit 303 and performing storage control (step S403). Also, at the same time, the print command transferring unit 304 requests transfer of the generated print command 207 to the printer 115, using the API of the OS (Step S403). In the event of saving the print command 207, the print command generating unit 301 determines a file name based on a randomly determined ID for each job and the page number, so this can be referenced in the processing of the second copy and thereafter. However, the method to determine the file name is not limited to this type of method. For example, a randomly determined name may be used as the file name, or lookup table to correlate the file name thereof and page number may be created separately.

Next, the print command saving determining unit 302 inquires the total number of pages of the job Pall to the layout filter 205 (step S404). The layout filter 205 also performs layout processing such that influences the page numbers such as with imposition. Therefore, the print command saving determining unit 302 has to inquire the physical number of pages to be finally printed (the total number of pages in the job Pall) to the layout filter 205. At this time, with the XPSDrv printing system, a communication method between filters provided by the OS called a Property Bag is generally used. With this type of method, the rendering filter 206 inquires and obtains the total number of pages of the job Pall that has been confirmed currently from the layout filter 205.

Next, the print command saving determining unit 302 determines the page spacing L to save the print commands 207 (step S405). According to the present embodiment, the page spacing L to save the print commands 207 is determined by calculations following the Expression (1) below.

$$L = (P\text{ all} - P)/(\text{Usable capacity of storage device})/(\text{print command size of current page}) \quad (1)$$

The usable capacity of the storage device in Expression (1) indicates the "size of the print command 207" that can be saved in the print command saving unit 303. For example in the case of saving the print commands 207 in a virtual region existing on a system drive of the HDD 110, the usable capacity of the storage device is determined based on the free space of the system drive. However, if all of the free space is used, the virtual storage device for the OS and other applications is lost, whereby the operation thereof can become unstable. Therefore, determining a usable capacity for the storage device by multiplying a usable ratio as to the free space is desirable (e.g. the usable capacity of the storage device can be half of the free space).

Also, according to the present embodiment, as described above, the generating and transferring of the print commands 207 are performed in parallel in the printing processing for the second copy and thereafter. To do so, a storage device is needed to temporarily store the already-generated print commands 207. Unlike the print commands 207 that are saved in the printing processing for the first copy, the print commands 207 herein are deleted after being transferred. Thus, with the printing processing for the second copy and thereafter, a storage device having a size that can save the print commands 207 for the page number performing generating and transferring in parallel is necessary, whereby the size worth thereof has to remain open in the storage device. Note that with the XPSDrv printing system, as described above, generating and transferring of the print commands 207 each operate with different processes, and so are automatically parallelized. Therefore, the data necessary for parallelizing the generating and transfer (the print command 207) is managed on the OS side.

In Expression (1), the denominator of the computation to find the page spacing L to save the print commands 207 indicate how many pages worth of print commands 207 of the same size as the current page can be saved. On the other hand, the numerator is a value subtracting the currently processing page number from the number of pages in the entire job, and so indicates the remaining number of pages. Thus, the page spacing L to save the print commands 207 is the page spacing in the case of saving the print commands 207 of the current page with uniform page spacing as to the remaining pages. Now, in the case that the "page spacing L to save the print commands 207" calculated in Expression (1) is a value smaller than 1, the value thereof is rounded down, whereby the page spacing L to save the print commands 207 becomes 0. The page spacing L to save the print commands 207 being 0 indicates that there is sufficient free space in the storage device and therefore the print commands 207 for all of the pages can be saved in the print command saving unit 303. On the other hand, in the case that the page spacing L to save the print commands 207 is a value greater than 1, the value thereof is rounded up, to increase the spacing to save the print commands 207.

As shown in step S405 in FIG. 4, each time the page spacing L to save the print commands 207 becomes 0 and saves the print commands 207, the print command saving determining unit 302 recalculates the page spacing L to save the print commands 207. This is for two reasons described below. The first is that there is no assurance that the printing data for all of the pages have been transmitted from the application 200 during processing of an identified page, and the number of total pages in the job Pall may be unconfirmed. The second is that the page spacing L to save the print commands 207 is calculated based on the size of the print command 207 of the page being processed, whereby in reality a difference may occur depending on the various pages of XPS data.

As a result of the determining in step S402, in the case that the page spacing L to save the print commands 207 is not 0, the following processing is performed. That is to say, the print command generating unit 301 generates the print command 207 of the current page, and the print command transferring unit 304 transfers the generated print commands 207 to the printer 115 (step S406). In step S406, unlike step S403, saving the print commands 207 to the print command saving unit 303 is not performed.

Upon thus transferring the print commands 207 with the print command transferring unit 304, the print command saving determining unit 302 subtracts 1 from the page spacing L to save the print command 207 (step S407). The page spacing L to save the print commands 207 is thus subtracted, and when the page spacing L to save the print commands 207 becomes 0, a flow to save the print commands 207 for step S403 and thereafter is started. By repeating such processing, and when there are no more remaining pages, the processing of the rendering filter 206 ends the processing for the first copy (step S408).

As shown in FIG. 3, at the time of printing the first copy, the print commands 207 are saved in uniform page spacing, and the saved print commands 207 are referenced at the time of printing the second copy and thereafter, the present embodiment enables reducing weight and increasing speed of the printing processing for the second copy and thereafter.

Figure 5:
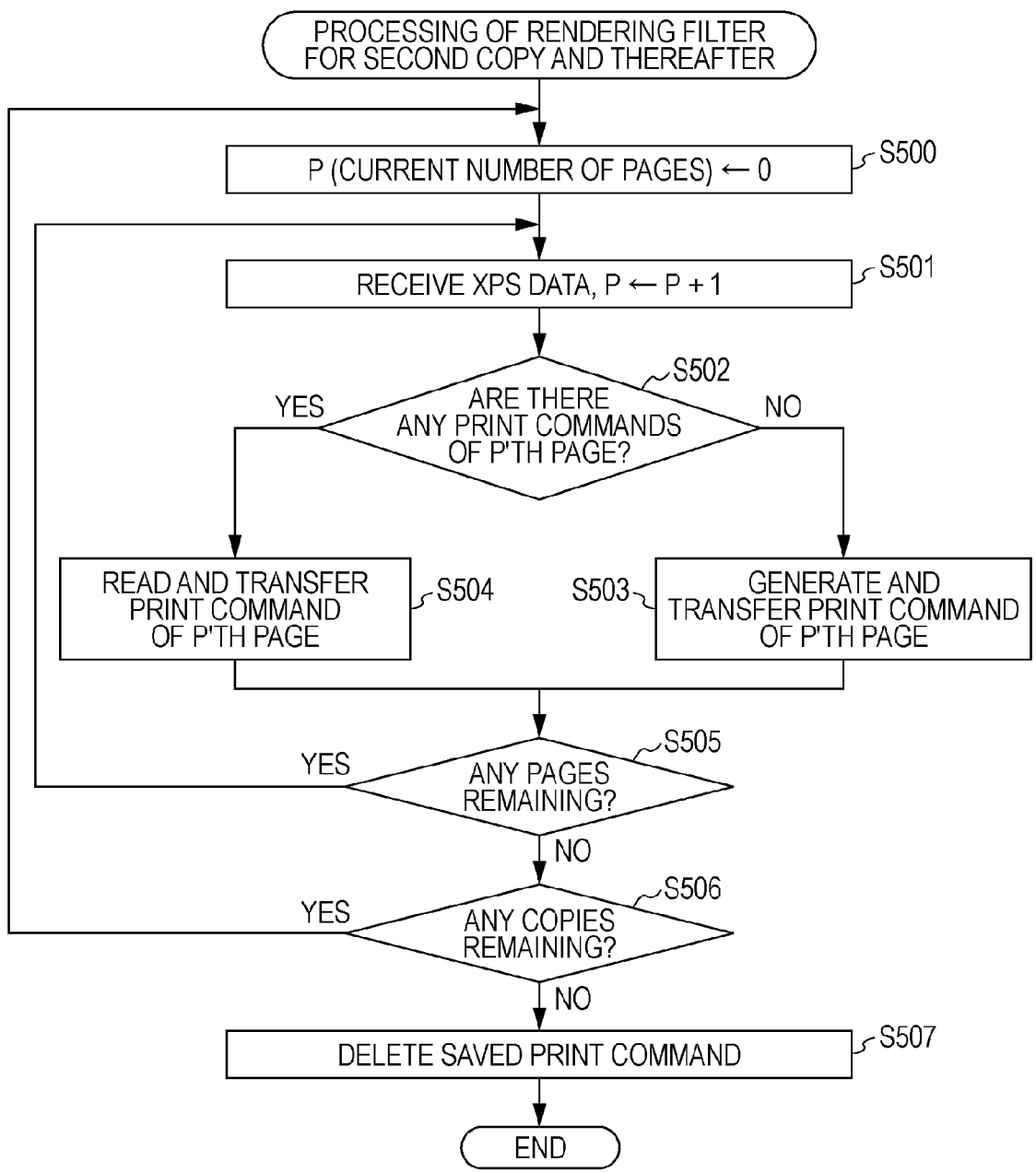
FIG. 5 is a flowchart describing an example of processing of a second copy and thereafter in the rendering filter in the event of performing printing with collating copies, according to the first embodiment of the present invention.

FIG. 5 is a flowchart describing an example of processing of the second copy and thereafter with the rendering filter 206 in the event of performing printing with collating copies. First, similar to the flowchart in FIG. 4, the rendering filter 206 manages the current number of pages P as the page number during processing, whereby the current number of pages P is initialized to 0 (step S500).

Next, upon receiving the XPS data of page (P+1) that is copied by the layout filter 205, the receiving unit 300 adds 1 to the current number of pages (step S501).

Next, the receiving unit 300 determines whether or not the print command 207 of the P'th page exists in the print command saving unit 303 (step S502). In Step S502, for example in the case that the print commands 207 is saved with a file name determined based on the value of the current page P in step S403, determination should be made as to whether or not an external file exists with a file name determined based on the current number of pages P. Also, in the case that a lookup table that can reference the file name of an external file based on the value of the current page P is saved in step S403, determination in step S502 can be made based on referencing step S403.

As a result of the determination in step S502, in the case that the print commands 207 of the P'th page exists in the print command saving 303, the print command transferring unit 304 reads the print commands 207 already saved in the print command saving unit 303. The print command transferring unit 304 performs instructions to transfer the read print commands 207 to the printer 115 (step S504).

On the other hand, in the case no print commands 207 for the P'th page exist in the print command saving unit 303, the print command generating unit 301 generates print commands 207 for the P'th save. The print command transferring unit 304 performs instructions to transfer the generated print commands 207 to the printer 115 (step S503). The XPS data of the P'th page is copied by the layout filter 205 as many times as the number of copies. Therefore, the print command generating unit 301 generates the print commands 207 based on the "XPS data of P'th page" obtained by the receiving unit 300 in step S501.

As described above, with the XPSDrv, the actual transferring processing of the print commands 207 is executed in parallel with a process that differs from the generating processing of the print commands 207. Accordingly, with the transfer request of the print command 207 from the filter, the print commands 207 are just saved in an external file. That is to say, in the "transfer processing by the print command transferring unit 304" that is executed in step S504, the print commands 207 that have already been saved in the print command saving unit 303 are just saved again as external files by the OS, and the processing thereof is normally completed instantly. Accordingly, in the case that the print commands 207 for the next page are not saved while the printer 115 is performing the printing processing of a certain page, the rendering filter 206 can start the generating processing of the print commands 207 in step S503. According to the present embodiment, the generating processing and transferring processing of the print commands 207 are thus performed in parallel.

Upon the processing of the print commands 207 of the P'th page ending, the receiving unit 300 determines whether or not there are any pages remaining that have not been processed (step S505). As a result of the determination herein, in the case that there are any remaining pages not processed, the flow is returned to step S501, and the processing in steps S501 through S504 is repeated until all of the pages are processed. If there are no more remaining pages, the receiving unit 300 determines whether or not there are any remaining copies not yet processed (step S506). As a result of the determination herein, in the case that there are any remaining copies not yet processed, the flow is returned to step S500, and the processing in steps S500 through S505 is repeated until all the rest of the copies are processed. At the point in time that there are no more remaining copies not yet processed, the receiving unit 300 deletes all of the print commands 207 for the first copy that have been saved in the print command saving unit 303 (step S507). The processing of the flowchart in FIG. 5 is then ended.

Thus, according to the present embodiment, at the time of printing processing of the first copy, the print commands 207 are saved within the usable storage capacity so that the page spacing to save the print commands 207 are as uniform as possible in the page unit, based on usable storage capacity. At the time of the printing processing of the second copy, the stored print commands 207 are reused and transferred to the printer 115, and the print commands 207 not stored are generated again. At this time, the transferring and generating of the print commands 207 are performed in parallel.

Figure 6:
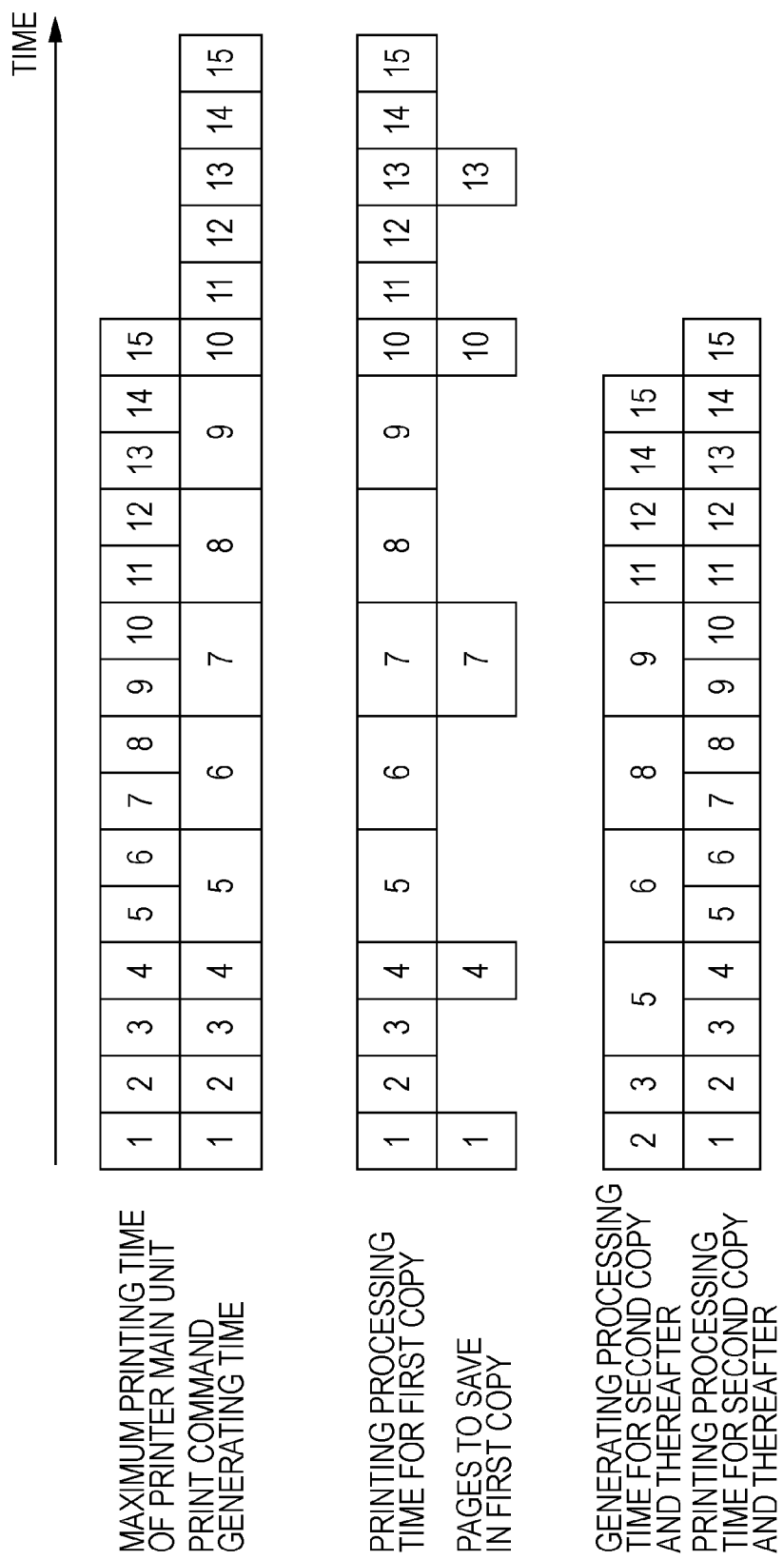
FIG. 6 is a diagram describing a specific example of an outline of the operations of the printing system according to the first embodiment of the present invention.

FIG. 6 is a diagram describing a specific example of an outline of the operations of the printing system according to the present embodiment. In the example shown in FIG. 6, let us say that the print job is a job of 15 pages, and the number of pages of print commands 207 that can be saved in the storage device is 5 pages. Let us say that the printer 115 can process all of the pages uniformly at time $t_1$ (the width of the small rectangle in FIG. 6 corresponds to time $t_1$, and the value is taken as 1). Also, let us say that the print commands 207 can generate pages 5 through 9 in time $t_2$ ($=2 \times t_1$), and any other pages in time t1. Also, in FIG. 6, time passes from left to right facing the diagram. Further, the numbers in the rectangles in FIG. 6 indicate page numbers.

As described above, the generating burden of print commands 207 from pages 5 through 9 is high, whereby the printing processing time for the first copy is longer than the maximum (minimum) printing time of the printer 115, as shown in FIG. 6. Let us say that the print commands 207 of the fifth page can be saved. In this case, according to the present embodiment, the page spacing for storing is saved as uniformly as possible, whereby the print commands 207 of the first, fourth, seventh, tenth, and thirteenth pages are saved.

With the printing processing of the second copy and thereafter, generating the print commands 207 of the saved pages is unnecessary, whereby the print commands 207 of pages other than the saved pages are generated. Consequently, the generating processing time of the print commands 207 of the second copy and thereafter becomes shorter than the maximum printing time of the printer 115, and also generating of the print commands 207 is completed by the printing completion of all of the pages. As a result, with the printing processing of the second copy and thereafter, printing can be performed at maximum speed of the printer 115.

In the case that the generating processing time of the print commands 207 for each page and the printing processing time of the printer 115 are the same, the configuration according to the present embodiment is a configuration having the least amount of waste. According to the present embodiment, the burden of generating the print commands 207 is distributed over the entire job at the time of printing processing of the second copy and thereafter. Therefore, in addition to the burden of the CPU 107 not being disproportionately shifted, the temporary storage device for processing the generating and transferring of the print commands 207 with the printing processing of the second copy and thereafter can be of minimum size. Thus, a simple configuration, wherein the print commands 207 are saved so that the page spacing to save the print commands 207 is uniform, which can obtain effective results with a normal print job, is one of the features of the present embodiment.

Second Embodiment

Next, the second embodiment of the present invention will be described. As described above, with the first embodiment, in the case that the generating processing time of the print commands 207 for each page and the printing processing time of the printer 115 is the same, the printing processing of the second copy and thereafter can be efficiently processed. However, with the first embodiment, even in the case that the identified pages during the job is complicated, and a large amount of time is required to generated the print commands of the identified pages thereof, the print commands 207 of the identified pages thereof are not necessarily saved, so this cannot be considered to be efficient. That is to say, in the case that the burden to generate the print commands 207 of the identified pages is extremely great, it is desirable to save the print commands 207 thereof at the time of printing processing of the first copy, but with the first embodiment, the print commands 207 are not necessarily saved. Thus, with the first embodiment, in the case that there is uneven distribution of the processing burden for the various pages in the job, the processing is not efficient processing.

Thus, according to the present embodiment, at the time of printing processing of the first copy, based on the time required to generate the print commands 207 and the printing time of the printer 115, determination is made as to whether or not the generating of the print commands 207 at the time of printing processing of the second copy will be in time for the printing by the printer 115. The print commands 207 of the pages, wherein the generating of the print commands 207 are determined to not be in time for the printing by the printer 115, are saved. Thus the present embodiment and the above-described first embodiment primarily differ in a portion of the saving processing of the print commands 207 at the time of printing processing of the first copy. Accordingly, in the description of the present embodiment, the portions that are the same as the first embodiment have the same reference numerals as the reference numerals appended in FIGS. 1 through 6, and detailed descriptions thereof are omitted.

Figure 7:
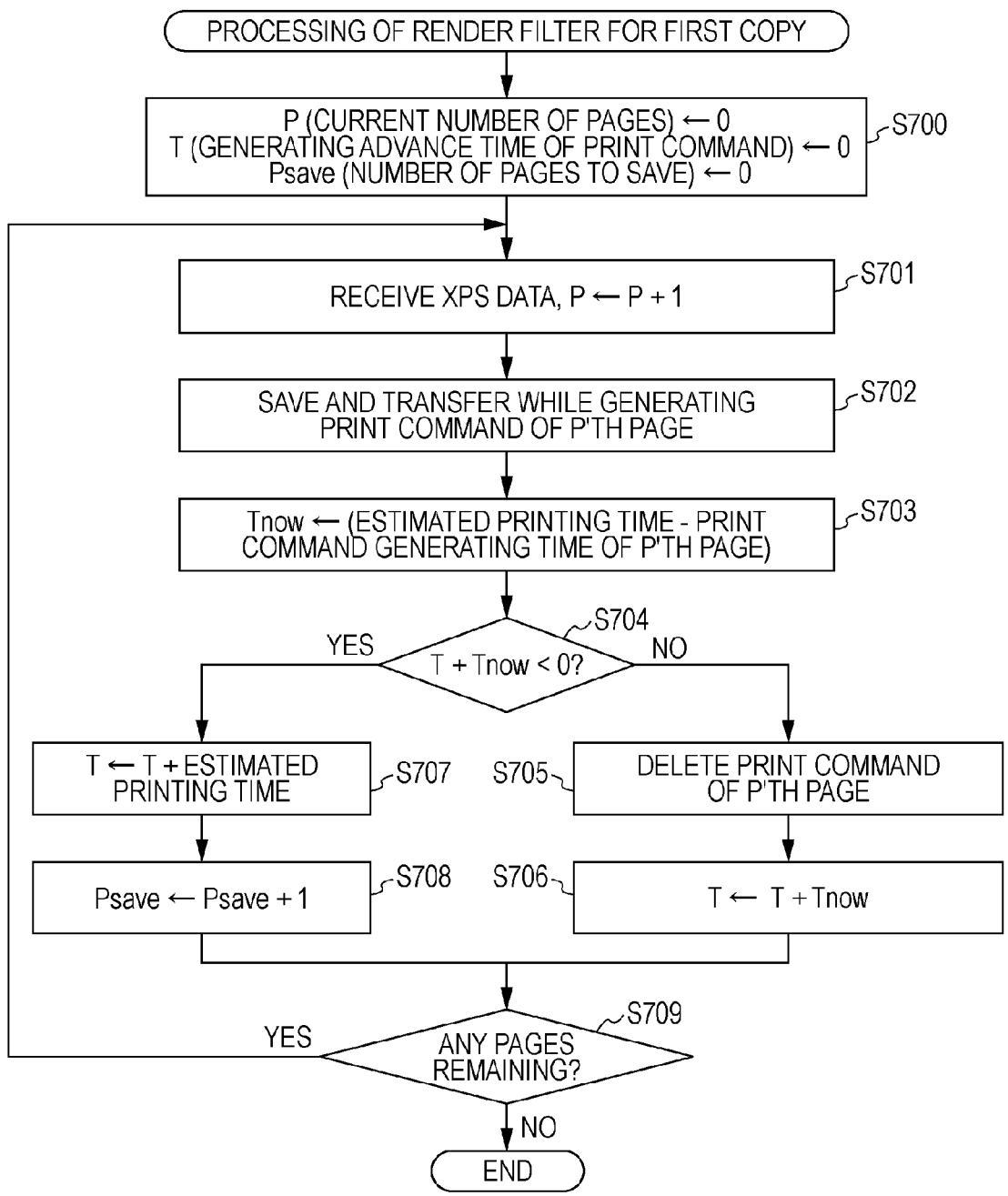
FIG. 7 is a flowchart describing an example of processing of a first copy in the rendering filter in the event of performing printing with collating copies, according to a second embodiment of the present invention.

FIG. 7 is a flowchart describing an example of processing of a first copy with the rendering filter 206 in the event of performing printing with collating copies. Note that the processing other than the print command saving determining unit 302 of the rendering filter 206 has the same configuration as that of the first embodiment, unless particularly noted otherwise.

First, the rendering filter 206 initializes P (current number of pages), T (value indicated in time increments as to how far the generating of the print commands 207 is advanced), and Psave (number of pages of which the print commands 207 are saved) to 0 (step S700). These parameters are stored in the RAM 109 or the like, for example. Note that in the description below, the value T indicated in time increments as to how far the generating of the print commands 207 is advanced is called print command generating advance time T, as needed.

Next, upon receiving the XPS data for page (P+1), the receiving unit 300 adds 1 to P which is the current number of pages (step S701).

Next, the print command generating unit 301 generates the print command 207 of the current page (step S702). According to the present embodiment, the time required for generating the print commands 207 are used for saving determining with the print command saving determining unit 302. Therefore, at the time of determining the print command saving determining unit 302, the print command generating unit 301 has already generated the print command 207. Generating the print commands 207 again with the print command generating unit 301 after determining to save with the print command saving determining unit 302 is wasteful. Therefore, all of the print commands 207 are temporarily saved in the print command saving unit 303 with step S702 and subjected to storing control. Also, at the same time, the print command transferring unit 304 requests transfer of the generated print command 207 to the printer 115, using the API of the OS (step S702).

Upon thus requesting transfer of the generated print command 207 to the printer 115, the print command saving determining unit 302 calculates the time Tnow of the page unit (step S703). Time Tnow is computed with the calculations according to the Expression (2) below.

$$T\text{now}=(\text{Estimated printing time}-\text{print command generating time for } P\text{'th page}) \quad (2)$$

The print command generating time can be found by measuring the time to perform generating of the print commands 207 in step S702. The estimated printing time indicates the time required to print the print commands 207 in the case that the printer 115 is able to receive the relevant print commands 207 without disruption. In other words, the estimated printing time estimates the maximum (minimum) printing time of the printer 115 as to the print commands 207 of the relevant pages.

With the configuration of the printer 115, in the case that the printing time of the page unit is substantially uniquely determined according to the size of printing paper or printing mode, the printer 115 has a lookup table with necessary configuration elements, whereby the estimated printing time can be obtained by using the lookup table. On the other hand, in the case of a printer having a configuration such as an inkjet printer, wherein the print head is moved to the region for printing and ink droplets are discharged, the printing time changes due to various reasons. That is to say, in the case that there is no printing region, the time to discharge the paper is the only time required. Even if the printing region is the same, if the colors used are different, the amount of ink droplets that can be discharged at once changes, whereby there are cases that the printing time changes. Thus, with the present embodiment, in order to obtain the estimated printing time of the printer 115, a case of employing one of the three methods described below will be taken as an example, although we cannot say this is perfect.

The first method to approximate the printing time of the printer 115 is a method having a lookup table that can be referenced based on conditions of printing paper size and printing mode (quality settings, etc.), and referencing the lookup table which indicates estimations of printing time.

FIG. 8 is a diagram showing an example of a lookup table. In FIG. 8, estimations of printing time of the printer 115 can be obtained using combinations of settings of paper type, printing quality, and gray scale. The printing time estimations are values that are measured and computed beforehand by the printer 115. The printing time estimations of the printer 115 may also be obtained by further combining paper size to the paper type, printing quality, and gray scale. The printing time shown in the lookup table in FIG. 8 indicates estimations of the printing time with the maximum paper size supported by the printer 115. Accordingly, in the case of referencing the printing time having a smaller paper size thereof, the estimated printing time can be obtained by recalculating the printing time according to the area ratio to the maximum paper size supported by the printer 115.

Also, with inkjet printers, generally RAM having just enough capacity to store all of the print commands 207 for one page worth is not held in the printer 115. Therefore, processing is performed to transmit the print commands 207 from the printer driver in the order of printing in ribbon-shaped regions, using the paper supply direction as a reference. The processing increment in zones is generally called a band. With the rendering filter 206, generating processing of the print commands 207 is performed in increments of bands. In this event, by counting the number of bands having no rendering commands, an approximation can be made as to roughly what ratio of the entire sheet is there a printing region. By multiplying the ratio of printing region thus obtained by the printing time referenced in the lookup table, an estimation of printing time can be computed more accurately.

The second method to approximate the printing time of the printer 115 is a method to monitor the transmission state with a language monitor or port monitor. In the configuration in FIG. 2, the language monitor is a module existing between the print command 207 and the printer 115, and has the roles of parsing the print commands 207 and transmitting these to the printer 115. The port monitor exists on the lower level of the language monitor, and performs transmission processing with appropriate methods, according to the port type.

As described above, an inkjet printer generally does not have a RAM having capacity to store the print commands 207 for an entire page. In the case that the capacity of the RAM in the printer 115 is full and additional print commands 207 cannot be received, the print commands 207 transmitted from the language monitor are not immediately accepted, but are made to wait until space is open in the RAM of the printer 115. By obtaining a total of the waiting time thus occurring, an approximation can be made as to how much later the printer 115 has been as to the generating time of the print commands 207. However, with this method, in the case that the generating of the print commands 207 is later than the printing operation of the printer 115, there is no way to know the degree of delay thereof. Accordingly, in the case that a delay has not occurred in the transmission of the print commands 207 over the entire page, the printing time of the printer 115 is determined by setting the printing time to high speed for a fixed amount of time as to the generating time of the print commands 207.

The third method to approximate the printing time of the printer 115 is to inquire to the printer 115. The printer 115 counts the amount of time that the RAM storing the received print commands 207 has been open, the number of times that data is discontinued, and so forth. The printer driver inquires the values thereof to the printer 115, and approximates the printing time of the printer 115 based on the generating time of the print command 207 and the values thereof.

Of the described methods, the first method requires a lookup table to be created according to the features of the printer 115, but the printing time of the printer 115 can be approximated without requiring a particular mechanism. The second method has cases wherein the printing time cannot be accurately approximated in the case that the printing processing of the printer 115 is at high speed, but creation of a lookup table is not required. The third method is accurate since the degree that the print commands 207 or printing are delayed is inquired to the printer 115, but a particular mechanism is required for the printer 115.

Also, the second and third methods basically have to confirm transmission of print commands 207 in page increments. The transmission processing of the print command 207 performed in step S702 is actually temporarily stored in an external file by the API of the OS, and the actual transmission processing is executed with a process separate therefrom. In the case of using a language monitor or in the case of inquiring the transmission state of the print commands 207 to the printer 115, the actual transferring processing of the print commands 207 are required to be completed. Therefore, before obtaining the time Tnow in step S703, completion of the actual transferring processing of the print commands 207 of the page thereof is awaited.

The estimated printing time can be obtained with one of the above methods. As described above, the print command saving determining unit 302 calculates the time Tnow based on the estimated printing time obtained with one of the above methods and the print command generating time. In the case that the generating of the print commands 207 is sufficiently high-speed, the time Tnow is a positive value, and in the case that the generating of the print commands 207 is delayed as to the printing speed of the printer 115, the time Tnow is a negative value. Thus, the print command saving determining unit 302 calculates whether the generating of the print commands 207 are not delayed, and in the case the generating thereof is delayed, calculates the degree of delay thereof of the page unit.

Next, the print command saving determining unit 302 determines whether or not the value added to the time Tnow, calculated in step S703, to the generating advance time T of the print command which is the total value of the time Tnow calculated up to now, is a negative value. The generating advance time T of the print command is derived by adding together the times Tnow obtained for each page, and is a "banked" time which the print command generating processing of the printer driver has advanced as to the printing processing of the printer 115. The timing wherein the generating advance time T of the print command is a positive value in the printing processing of the second copy and thereafter indicates that the printer driver is processing in advance of the printer 115 just the amount of time indicated by the generating advance time T of the print command. Conversely, the timing wherein the generating advance time T of the print command is a negative value indicates that the generating processing of the print commands 207 is delayed as to the printing processing of the printer 115, i.e. the printer 115 is being made to wait. Accordingly, as a result of the determination in step S704, in the case that the value that adds the time Tnow to the current value of the generating advance time T of the print command (=T+Tnow) is a negative value, processing is performed to save the print commands 207 of the current page (steps S707 and S708).

In the case of saving the print commands 207, with the printing processing of the second copy and thereafter, the already-saved print commands 207 can be referenced, so the print command generating time of the page thereof is substantially 0. Accordingly, the print command saving determining unit 302 performs the next processing without adding Tnow as to the current page which is a negative value to the print command generating advance time T. That is to say, the print command saving determining unit 302 adds the time that the printer driver has become usable by saving the print commands 207 (estimated printing time of the printer 115) to the generating advance time T of the print command (step S707).

Next, the print command saving determining unit 302 adds 1 to the saved number of pages of the print commands 207 (step S708).

On the other hand, as a result of determining in step S704, in the case that the value that adds the time Tnow to the current value of the generating advance time T of the print command (=T+Tnow) is a positive value, even if the print commands 207 of the current page are generated the printing is not delayed. Accordingly, the print command saving determining unit 302 deletes the "print commands 207 of the current page" saved in step S702 and performs storage control (step S705). Regarding the page herein, the generating processing of the print commands 207 which is the same as the first copy is operated again for the second copy and thereafter also. Therefore, the print command saving determining unit 302 adds the time Tnow of the current page to the generating advance time T of the print commands (step S706).

Upon the above steps S706 and S708 ending, the receiving unit 300 determines whether or not there are any remaining pages not yet processed (step S709). As a result of the determining herein, in the case that there are remaining pages not yet processed, the flow is returned to step S701, and the processing in steps S701 through S708 is repeated until all of the pages are processed. When there are no more remaining pages, the processing of the rendering filter 206 for the first copy is ended.

Note that the maximum value of the generating advance time T of the print commands described in the flowchart in FIG. 7 is affected by the greatest number of pages wherein parallel processing can be performed for the printing processing of the second copy and thereafter. For example, in the case that the estimated printing time is 10 seconds, to say that the generating advance time T of the print commands is 40 seconds indicates that the generating processing of the print commands 207 worth four pages is advanced farther than the printing processing of the printer 115. Thus, the maximum value of the generating advance time T of the print commands is determined beforehand, based on the maximum number of pages wherein parallel processing can be performed for the printing processing of the second copy and thereafter, and based on the estimated printing time, so that the generating advance time T of the print commands calculated in steps S706 and S707 does not exceed the maximum value thereof. By saving the print commands 207 of the identified pages, the time that the printer driver is usable can be transferred as the generating advance time T of the print commands, which is a feature of the present embodiment. The concept of the generating advance time T of the print commands being transferred, as described above, becomes effective when the generating and transferring of the print commands 207 are operated in parallel.

Thus with the processing of the rendering filter 206 of the second copy and thereafter in the case that a portion of pages of the first copy are saved, as shown in FIG. 5, if there are any print commands 207 these are read and transferred, and if not, generating again and transferring the print commands 207 is the basic configuration. The print commands 207 required for the printer 115 to print at maximum speed should be all saved at the time of printing processing of the first copy. Accordingly, with the printing processing of the second copy and thereafter, as long as the processing shown in FIG. 5 is performed, the printing should be capable at maximum speed of the printer 115, according to calculations. However, in the case that the printing request is to print 10 copies, for example, further saving the print commands 207 at the time of printing processing of the second copy by effectively using the storage device free space in the print command saving unit 303 enables performing printing processing of the third copy and thereafter with a reduced amount.

Figure 9:
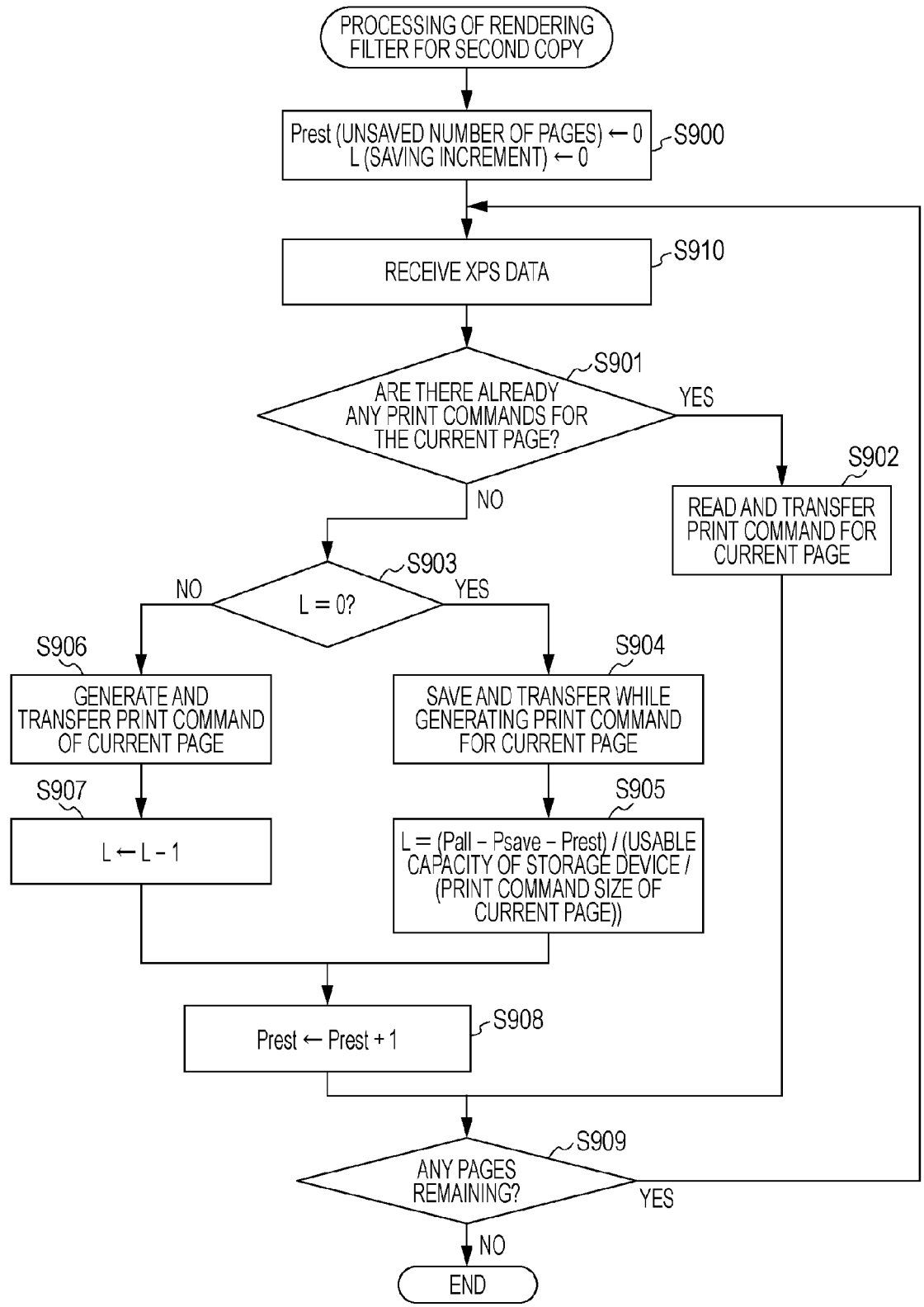
FIG. 9 is a flowchart describing an example of processing of a second copy in the rendering filter in the event of performing printing with collating copies, according to the second embodiment of the present invention.

FIG. 9 is a flowchart describing an example of processing of a second copy with the rendering filter 206 in the event of performing printing with collating copies. As described above, the printing processing for the second copy can be performed as shown in FIG. 5, but the description here gives an example of a case wherein the print commands 207 are saved also at the time of printing processing of the second copy by effectively using the free space of the storage device of the print command saving unit 303. Note that as an example, description will be given here of an example to save the print commands 207 at the time of printing processing of the first copy, so that the page spacing to save the print commands 207 is uniform. The basic processing itself to save the print commands 207 is the same as the "determining method of pages to save the print commands 207" described with the first embodiment (see FIG. 4).

First, the rendering filter 206 initializes the Prest (number of pages not saved with the printing processing of the first copy) and L (page spacing to save the print commands 207) to 0 (step S900). These parameters are stored in the RAM 109 for example.

Next, the receiving unit 300 receives the XPS data of the current page (step S910).

Next, the receiving unit 300 determines whether or not the print commands 207 of the current page have been saved in the storage device of the print command saving unit 303 in the printing processing of the first copy (step S901). As a result of the determination here, in the case there are print commands 207, the next processing is performed. That is to say, the print command transferring unit 304 performs instructions to read the already-generated print commands 207 from the print command saving unit 303, and transfer the read print commands 207 to the printer 115 (step S902). The flow then advances to a later-described step S909.

On the other hand, in the case there are no print commands 207, the print command saving determining unit 302 determines whether the page spacing L to save the print commands 207 is 0 (step S903). As a result of the determination herein, in the case that the page spacing L to save the print commands 207 is 0, the print command generating unit 301 performs the following processing. That is to say, the print command generating unit 301 generates the print commands 207 of the current page, based on the "XPS data of the current page" received by the receiving unit 300, while saving to the print command saving unit 303 and performing storage control (step S904). Also, at the same time, the print command transferring unit 304 requests the generated print commands 207 to be transferred to the printer 115 (step S904).

Next, the print command saving determining unit 302 determines the page spacing L to save the print commands 207 with calculations according to the Expression (3) below (step S905).

$$L = (Pall - Psave - Prest)/(\text{usable capacity of storage device}/\text{print size command of current page}) \quad (3)$$

In Expression (3), Pall indicates the total number of pages of a job, and becomes known at the point in time of the printing processing of the first copy. Psave indicates the number of pages of which the print commands 207 are saved in the printing processing of the first copy (step S702). Prest indicates the processing number of pages of which the print commands 207 are not saved in the printing processing of the first copy (step S702). Accordingly, the numerator in Expression (3) (=Pall−Psave−Prest) indicates the remaining number of pages excluding the pages already saving the print commands 207 in the printing processing of the first copy. On the other hand, the denominator is a value derived by dividing the usable capacity of the storage device in the print command saving unit 303 by the size of the print commands 207 of the current page, and indicates the number of pages of print commands 207 that can be saved. Accordingly, L in Expression (3) is the page spacing in the case of saving the savable print commands 207 of the print commands 207 not saved in the printing processing of the first copy, so that the page spacing is uniform. Upon computing the page spacing L to save the print commands 207 as above, the flow is advanced to step S908 described above.

As a result of the determination in step S903 as described above, in the case that the page spacing L to save the print commands 207 is not 0, the following processing is performed. That is to say, the print command generating unit 301 generates the print commands 207 of the current page, and the print command transferring unit 304 transfers the generated print command 207 to the printer 115 (step S906). In step S906, unlike step S904, the print commands 207 of the current page are not saved in the print command saving unit 303.

Next, the print command saving determining unit 302 subtracts 1 from the page spacing L to save the print commands 207 (step S907). The flow is advanced to step S908.

Upon the processing in steps S905 and S907 being performed, the rendering filter 206 adds 1 to the number of pages not saved in the printing processing of the first copy, Prest (step S908). The flow is then advanced to step S909.

Upon the processing in steps S902 and S908 being performed, the receiving unit 300 determines whether or not there are any remaining pages not yet processed (step S909). As a result of the determination herein, in the case there are remaining pages not yet processed, the flow is returned to step S910, and the processing in steps S910 through S908 are repeated until all of the pages are processed. When there are no more remaining pages, the processing of the second copy with the rendering filter 206 is ended.

Thus the printing processing of the third copy and thereafter in the case of saving by adding the printing commands 207 in the printing processing of the second copy is similar to the processing shown in FIG. 5.

Figure 10:
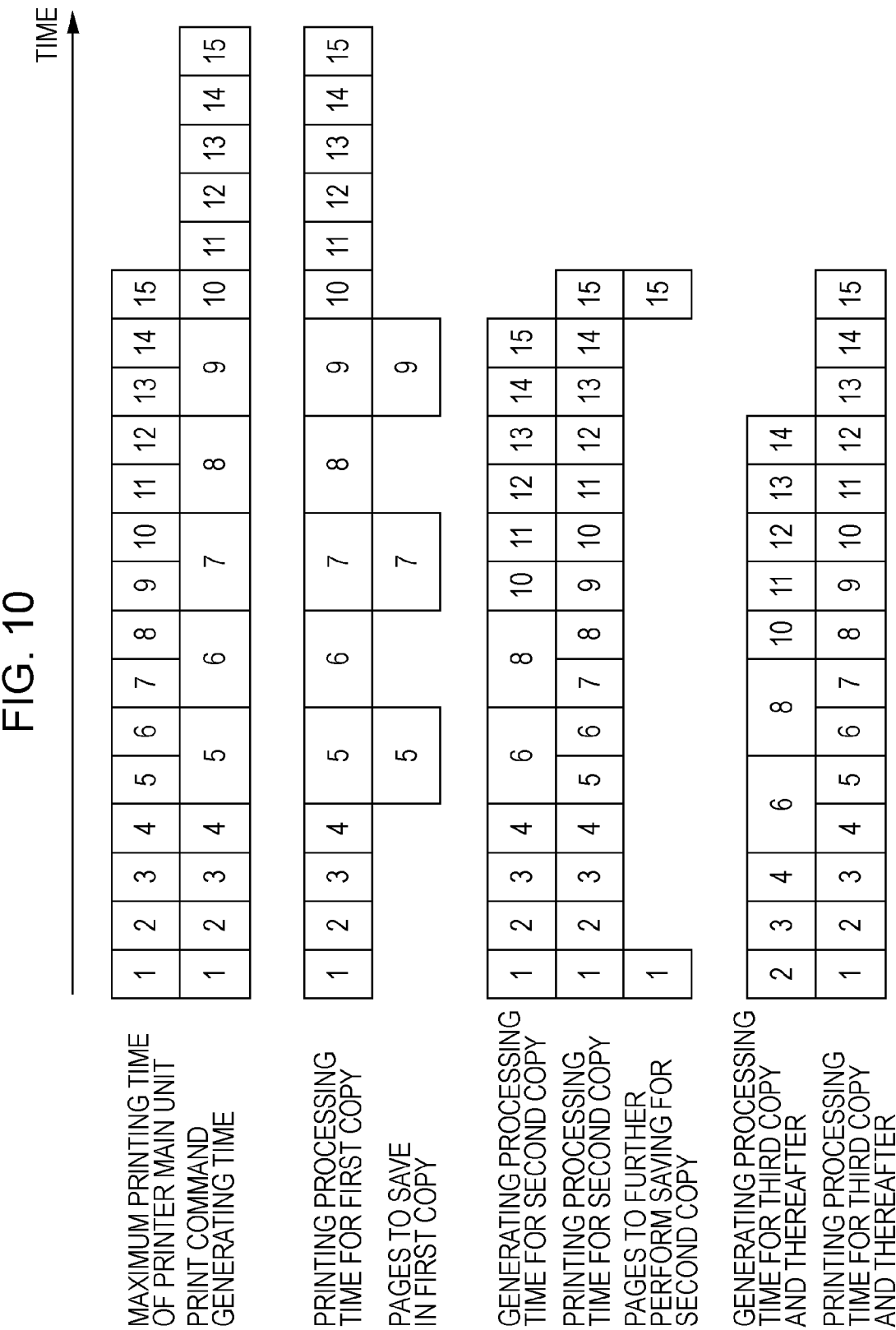
FIG. 10 is a diagram describing a specific example of an outline of the operations of the printing system according to the second embodiment of the present invention.

FIG. 10 is a diagram describing a specific example of an outline of the operations of the printing system according to the present embodiment. Similar to that shown in FIG. 6, let us say that the print job is a job of 15 pages, and the number of pages of print commands 207 that can be saved in the storage device of the print command saving unit 303 is 5 pages. Let us say that the printer 115 can process all of the pages uniformly at time $t_1$ (the width of the small rectangle in FIG. 10 corresponds to time $t_1$, and the value is taken as 1). Also, let us say that the print commands 207 can generate pages 5 through 9 in time $t_2$ (=2×t), and any other pages in time $t_1$. Also, in FIG. 10, time passes from left to right facing the diagram. Further, the numbers in the rectangles in FIG. 10 indicate page numbers.

In FIG. 10, up to the fourth page the printing time of the printer 115 and the generating time of the print commands 207 match, whereby the generating advance time T of the print commands becomes 0. In the stage of the fifth page the time Tnow becomes −1 (=1−2), and becomes a negative value (step S703). Accordingly, the print commands 207 of the fifth page are subject to saving (step S704). By saving the print commands 207 of the fifth page, 1 which is the printing processing time of the fifth page (estimated printing time) is added to the generating advance time T of the print commands, which becomes 1 (step S707).

The time Tnow in the sixth page is −1, similar to the fifth page, but since the generating advance time T of the print commands is 1, the added values herein (=T+Tnow) become 0. Accordingly, the print commands 207 of the sixth page are not subject to saving (step S704). Thus from the fifth page to the ninth page, the print commands 207 are saved, opening a space of one page each therebetween. That is to say the print commands 207 of the pages 5, 7, and 9 are saved.

The total generating time of the print commands 207 of the pages excluding pages 5, 7, and 9 is the generating time of the print commands 207 for the second copy. As shown in FIG. 10, the generating processing time of the print commands 207 for the second copy is shorter than the maximum printing time of the printer 115, and the generating of the print commands 207 are completed for all of the pages by the time of printing completion. As a result, with the printing processing for the second copy, all of the pages can be printed at the maximum (shortest) printing time of the printer 115. Since the print commands 207 for 3 pages are already stored at this point in time, the print command 207 for a further 2 pages can be saved. Accordingly, the print commands 207 for a further two pages are saved, following the flowchart shown in FIG. 9. Thus, at the stage that the printing processing for the second copy is completed, the print commands 207 for the first, fifth, seventh, ninth, and fifteenth pages are stored. In the printing processing for the third copy and thereafter, the printing commands 207 for the pages excluding the pages thereof are generated alone, which can be printed at the maximum speed of the printer 155, and also the processing burden by the CPU can be reduced.

Thus with the present embodiment, saving the minimally-required print commands 207 to print the second copy and thereafter at maximum speed of the printer 115 is performed at the time of printing processing of the first copy. In the case that there is free space in the storage device of the print command saving unit 303 at the time of printing processing of the second copy, the free space thereof is used effectively and the print commands 207 are further saved so that the page spacing of the newly saved print commands 207 are uniform. With the printing processing of the third copy and thereafter, the free space of the storage device of the print command saving unit 303 is used while assuring that printing can be performed at maximum speed of the printer 115, whereby the processing burden by the CPU can be reduced.

Note that processing to save the print commands 207 at the time of printing processing for the second copy (processing in the flowchart in FIG. 9) may be made applicable to the first embodiment.

Third Embodiment

Next, the third embodiment of the present invention will be described. According to the present embodiment, two of the print command saving methods described in the second embodiment are simultaneously executed at the time of printing processing for the first copy. That is to say, a method to save the pages wherein the generating of the print commands 207 will be delayed for printing so as to be prioritized, and a method to save the print commands 207 for number of pages that can be saved so that the page spacing is uniform, are simultaneously executed. Thus the present embodiment and the above-described first and second embodiments primarily differ in a portion of the printing processing of the first copy. Accordingly, in the description of the present embodiment, the portions that are the same as the first and second embodiment have the same reference numerals as the reference numerals shown in FIGS. 1 through 10, whereby detailed description thereof will be omitted.

Figure 11:
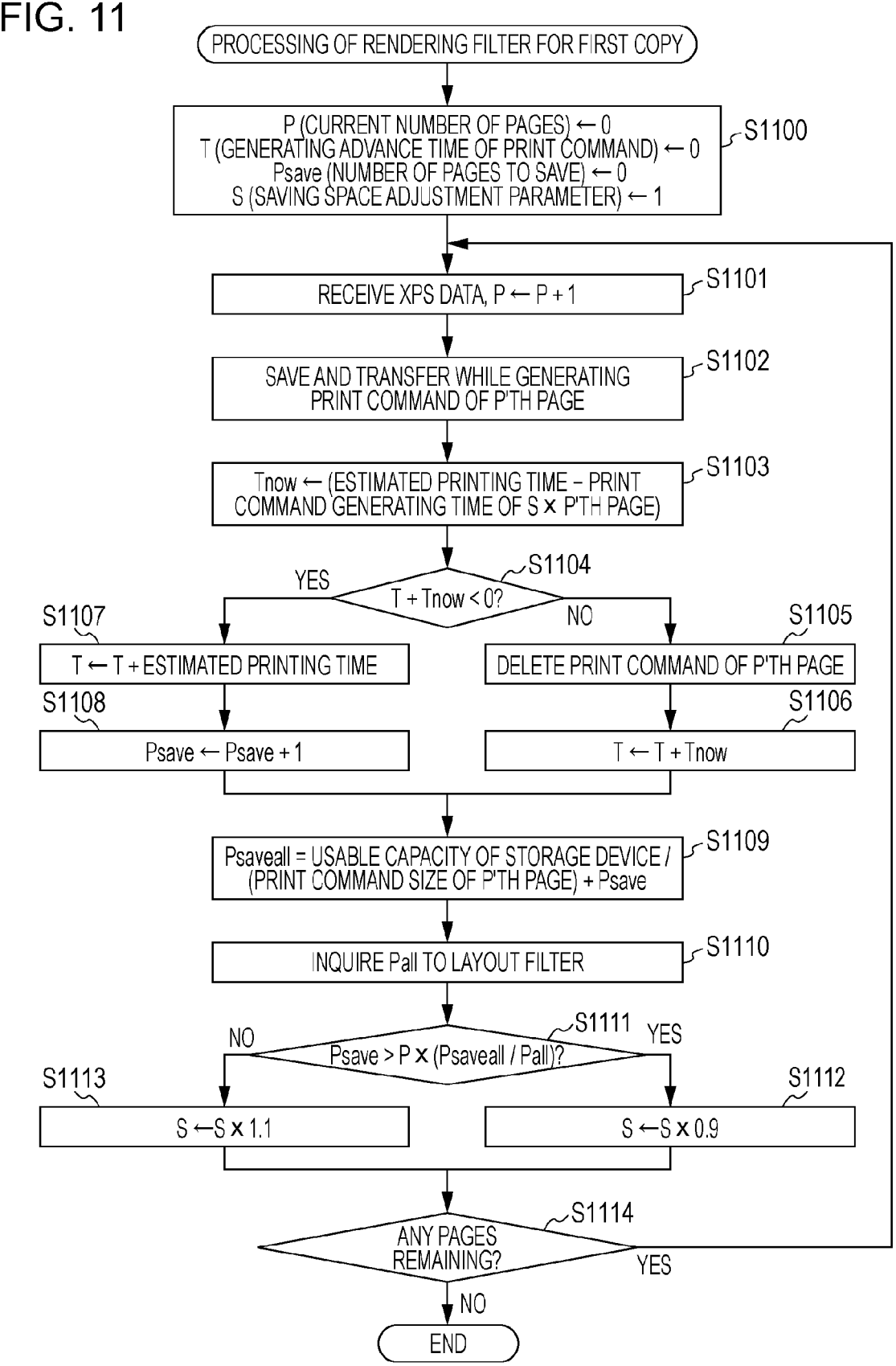
FIG. 11 is a flowchart describing an example of processing of a first copy in the rendering filter in the event of performing printing with collating copies, according to a third embodiment of the present invention.

FIG. 11 is a flowchart describing an example of processing of the first copy in the rendering filter 206 in the event of performing printing with collating copies. Note that the processing other than the print command saving determining unit 302 of the rendering filter 206 has the same configuration as that of the first and second embodiments, unless particularly noted otherwise. First, the rendering filter 206 initializes various types of parameters (step S1100). The various types of parameters are P (current number of pages), Psave (number of pages of which the print commands 207 are saved), T (generating advance time of print commands), and S (parameter to adjust the pace for saving the print commands 207). Specifically, the current number of pages P, the number of pages saving the print commands 207 Psave, and the generating advance time for print commands T are initialized to 0, and the parameter S to adjust the pace for saving the print commands 207 is initialized to 1. Note that in the description below, the parameter S to adjust the pace for saving the print commands 207 will be called the saving pace adjusting parameter S, as needed. Also, these parameters are stored in the RAM 109 or the like, for example.

Next, upon receiving the XPS data for page (P+1), the receiving unit 300 adds 1 to P which is the current number of pages (step S1101).

Next, the print command generating unit 301 generates the print command 207 of the current page while saving to the print command saving unit 303 and performing storage control (step S1102). Also, at the same time the print command transferring unit 304 requests transfer of the generated print commands 207 to the printer 115, using an API of the OS (step S1102).

Next, the print command saving determining unit 302 calculates (derives) time Tnow according to the Expression (4) below (step S1103).

$$Tnow = (S \times \text{estimated printing time} - \text{print command generating time for } P\text{'th page}) \quad (4)$$

The definition and computation method of the estimated printing time is as described in the second embodiment. The print command generating time for the P'th page (current page) also is obtained by actually measuring the generating time of the print commands 207 in the print command generating unit 301, similar to the second embodiment. As described above, the parameter S is a parameter to adjust the pace for saving the print commands 207, and the value thereof is normally 1. The time Tnow obtained in step S1103 has basically the same meaning as the time Tnow obtained in step S703. However, the time Tnow of the present embodiment adds the concept of the saving pace adjusting parameter S, thereby differing from the time Tnow of the second embodiment in this point.

Next, the print command saving determining unit 302 determines whether or not a value adding the time Tnow calculated in step S703 to the generating advance time T of the print commands which is the total value of time Tnow calculated up to this point is a negative value (step S1104). As a result of the determination herein, in the case that the value adding the time Tnow to the current value of the generating advance time T of the print commands (=T+Tnow) is a positive value, even if the print commands 207 of the current page are generated there is no delay to print. Accordingly, the print command saving determining unit 302 deletes the "print commands 207 of the current page" saved in step S1102 and performs storage control (step S1105).

Next, the print command saving determining unit 302 adds the "time Tnow of the current page" that has been calculated in step S1103 to the generating advance time T of the print commands (step S1106). The flow is then advanced to the later-described step S1109.

As a result of the determination in step S1104, in the case that the value adding the time Tnow to the current value of the generating advance time T of the print commands (=T+Tnow) is a negative value, processing to save without deleting the "print commands 207 of the current page" saved in step S1102 is performed. That is to say, the print command saving determining unit 302 adds the estimated printing time which is the free space occurring by saving the print command 207 as to the generating advance time T of the print commands instead of the time Tnow (step S1107).

Next, the print command saving determining unit 302 adds 1 to the number of pages saving the print commands 207 Psave (step S1108). The flow is then advanced to step S1109.

Upon the processing in steps S1106 and S1108 ending, the print command saving determining unit 302 performs the calculations following the Expression (5) below to computes the storable number of pages Psaveall (step S1109).

$$P\text{saveall} = \text{usable capacity of storage device}/\text{print command size of current page} + P\text{save} \quad (5)$$

The (usable capacity of storage device/print command size of current page) in Expression (5) indicates how many more pages worth of print commands 207 of the same size as the print commands 207 of the current page can be saved. The number of pages of print commands 207 saved up to now Psave is added to the "number of savable remaining print command pages" thus obtained, and the storable number of pages Psaveall is obtained. The storable number of pages Psaveall is the total number of pages with print commands 207 that can be generated with the usable capacity of the print command saving unit 303. The storable number of pages Psaveall is an approximated value based on the size of the print commands 207 of the current page. Actually the size of the print commands 207 differs by page, whereby the storable number of pages Psaveall is recalculated for each page.

Next, the print command saving determining unit 302 inquires the total number of pages of the job Pall to the layout filter 205 (step S1110). The total number of pages of the job Pall also has no assurance of confirming with a timing of initial inquiry, so inquiry is performed for every page.

Next, the print command saving determining unit 302 determines whether or not the Expression (6) below is satisfied.

$$P\text{save} > P \times (P\text{saveall}/P\text{all}) \quad (6)$$

In Expression (6), the (Psaveall/Pall) is a ratio expressing uniform page spacing of print commands 207. By multiplying this value by the current number of pages P, the number of pages that can be saved in the stage of the current page can be obtained in the case of saving the print commands 207 with uniform page spacing. The number of pages Psave, which the print commands 207 are saved, indicates, of the pages up to the current number of pages P, the pages actually saving the print commands 207. That is to say, in step S1111, determination is made as to whether the current value of page numbers that have the print commands 207 saved is excessive or insufficient when saving the print commands 207 so that the page spacing is uniform over the entire job.

In the case that Expression (6) is satisfied, the results of the determination in S1111 indicate that the number of saved pages is large. Thus, the print command saving determining unit 302 multiplies 0.9 by the saving page adjusting parameter S, and takes the saving page adjusting parameter S as a small value (step S1112).

The saving page adjusting parameter S is referenced in step S1103, and is a parameter to disguise the print command generating time by being multiplied by the print command generating time. By taking the saving page adjusting parameter S as a small value, the time Tnow is calculated as the print command generating time being short, and consequently the time Tnow is adjusted so as to more readily be a positive value. Consequently, saving the print command 207 can be suppressed.

On the other hand, in the case that Expression (6) is not satisfied, the results of the determination in S1111 indicate that the number of saved pages is insufficient. Thus the print command saving determining unit 302 multiplies the saving page adjusting parameter S by 1.1 and takes the saving page adjusting parameter S as a large value (step S1113). Thus, the print command generating time is disguised as long, whereby the saving of the print command 207 can be prompted.

Now, an example is shown in the case of the print command saving determining unit 302 multiplying the saving page adjusting parameter S by 1.1 or 0.9, but the value to multiply may be a value other than this. Also, the saving page adjusting parameter S may also be a parameter that changes according to the amount of difference between the number of pages that should already be saved if the print commands 207 are saved so that the page spacing is uniform, and the number of pages that are already saved.

Upon the processing in steps S1112 and S113 ending, the receiving unit 300 determines whether or not there are any remaining pages not yet processed (step S1114). As a result of the determining herein, in the case that there are remaining pages not yet processed, the flow is returned to step S1110, and the processing in steps S1101 through S1113 are repeated until all of the pages are processed. When there are no more remaining pages, the processing of the rendering filter 206 for the first copy is ended.

According to the present embodiment, the print commands 207 are saved so as to use up the usable capacity of the print command saving unit 303 in the state that the printing processing for the first copy has ended. Accordingly, the processing of the second copy and thereafter of the rendering filter 206 is the same processing as the processing shown in FIG. 5. That is to say, with the pages of which the print commands 207 are already saved, the print commands 207 thereof are reused and transmitted to the printer 115, and with the pages of which the print commands 207 are not already saved, the print commands 207 thereof are generated again and transmitted to the printer 115.

With the present embodiment, the processing to save the pages for which generating of the print commands 207 will be delayed for printing is given priority, and the processing to save the print commands 207 for the savable number of pages so that the page spacing is uniform, are executed at the same time as the printing processing of the first copy. With the second embodiment, for example, there may be situations that do not function correctly in the case that generating the print commands 207 for all of the pages in the job is a heavy burden, and free space in the print command saving unit 303 is low. This is because the print commands 207 for the first half of the job are saved disproportionately. On the other hand, according to the present embodiment, even in a case that the generating of the print commands 207 are delayed for printing, the page spacing to save the print commands 207 is somewhat uniform over the entire job. Therefore, generating of the print commands 207 is not disproportionately shifted towards the first half of the job. This is realized by the processing to adjust the saving pace adjusting parameter S to be smaller in step S1112.

Conversely, the processing to adjust the saving pace adjusting parameter S to be larger in step S1113 is an adjustment to prompt saving of the print commands 207. Thus, the adjustment in step S1113 may be omitted and the pages to save during the printing processing for the first copy can be determined while performing the adjustment in step S1112 alone. In such a case, the processing in the flowchart shown in FIG. 9 is performed at the time of printing processing for the second copy, and (in the case of any free space in the print command saving unit 303) more of the print commands 207 can be saved.

Also, according to the present embodiment, the smaller the value of the saving pace adjusting parameter S for the timing to generate the print commands 207, the more important is the saving of the print commands 207 thereof. A print command 207 that is saved with an extremely large saving pace adjusting parameter S is saved regardless of the generating processing of the print commands 207 having sufficient time for the printer 115 to perform the printing operations. Conversely, a print command 207 that is saved with an extremely small saving pace adjusting parameter S is saved with open spacing because of a problem with free space in the print command saving unit 303, even though saving is desired to be performed as often as every page.

Thus, the following arrangement may be made using the saving pace adjusting parameter S. That is to say, in the event of saving the print commands 207, the value of the saving pace adjusting parameter S at the point in time thereof is saved. In the case that the saving pace adjusting parameter S is a smaller value than a threshold value, the already-saved print commands 207 which correspond to a saving pace adjusting parameter S of a value greater than a threshold are deleted. Thus, data that can have a suddenly high processing burden in the latter half of the job can be flexibly handled.

FIG. 12 is a diagram describing a specific example of an outline of the operations of the printing system according to the present embodiment. Similar to that shown in FIGS. 6 and 10, with the example shown in FIG. 12 also, let us say that the print job is a job of 15 pages, and the number of pages of print commands 207 that can be saved in the storage device of the print command saving unit 303 is 5 pages. Let us say that the printer 115 can process all of the pages uniformly at time $t_1$ (the width of the small rectangle in FIG. 12 corresponds to time $t_1$, and the value is 1). Also, let us say that the print commands 207 can generate pages 5 through 9 in time $t_2$ ($=2 \times t_1$), and any other pages in time t1. Also, in FIG. 12, time passes from left to right facing the diagram. Further, the numbers in the rectangles in FIG. 12 indicate page numbers.

According to the basic configuration of the present embodiment, at the time of printing completion of the first copy, the saving of five pages of print commands 207 are completed. Although changeable according to the adjusting value in steps S1112 and S1113, determination is made as shown in FIG. 12 that the number of pages to save the print commands 207 are greater with the fifth through ninth pages which have a high generating burden of print commands 207, and less with the other pages. As shown in FIG. 12, the "generating processing time of the print commands 207" according to the printing processing for the second copy is shorter than the maximum (shortest) printing time of the printer 115, and generating of the print commands 207 is completed by the time all of the pages have completed printing. As a result, with the printing processing for the second copy and thereafter, all of the pages can be printed with the maximum printing time of the printer 115.

Fourth Embodiment

Next, the fourth embodiment of the present invention will be described. According to the present embodiment, similar to the third embodiment, the optimal number of print commands 207 that should be saved at the time of printing processing for the first copy is determined. With the first through third embodiments, the configuration is such that the print commands 207 are saved for each page. However with the present embodiment, the configuration is such that the print commands 207 for all of the pages are saved, and only the pages determined to be unnecessary are deleted. Thus the present embodiment and the first through third embodiments primarily differ although the print commands 207 are saved. Accordingly, in the description of the present embodiment, the portions that are the same as the first through third embodiment have the same reference numerals as the reference numerals shown in FIGS. 1 through 12, whereby detailed description thereof will be omitted.

FIG. 13 is a flowchart describing an example of processing of a first copy in the rendering filter 206 in the event of performing printing with collating copies. Note that the processing other than that of the print command saving determining unit 302 of the rendering filter 206 is the same as that of the first through third embodiments, unless particularly noted otherwise.

First, the rendering filter 206 initializes P (current number of pages) and Psave (number of pages of which the print commands 207 are saved) to 0 (step S1300). These parameters are stored in the RAM 109 or the like, for example. Next, upon receiving the XPS data for page (P+1), the receiving unit 300 adds 1 to P which is the current number of pages (step S1301).

Next, the print command generating unit 301 generates the print commands 207 of the current page while saving in the print command saving unit 303 and performing storage control (step S1302). Also, at the same time the print command transferring unit 304 requests the generated print commands 207 to be transferred to the printer 115, using the API of the OS (step S1302). Next, the print command saving determining unit 302 obtains a parameter Tp for each page by performing calculations following the Expression (7) below (step S1303).

$$Tp=\text{(estimated printing time of current page--print command generating time for current page)} \quad (7)$$

In Expression (7), the estimated printing time is an estimated value of the maximum (shortest) printing time of the printer 115 in the case of printing the current page, and the calculating method thereof is the same as that described in the second and third embodiments. Let us say that the time required to generate the print commands 207 for the current page is the actual measurement value of the time from the XPS data being received in step S1301 until the generating of the print commands 207 is completed in step S1302. The parameter Tp obtained by the difference herein is saved for the page unit.

According to the present embodiment, upon generating the print commands 207 in step S1302, the print command generating unit 301 constantly saves the print commands 207 thereof in the print command saving unit 303. Accordingly, the print command saving determining unit 302 adds 1 to the number of pages Psave for which the print commands 207 are saved (step S1304).

Next, the receiving unit 300 determines whether or not there are any remaining pages not yet processed (step S1305). As a result of the determination herein, in the case there are no remaining pages not yet processed, the processing of the rendering filter 206 for the first copy is ended.

On the other hand, in the case there are remaining pages not yet processed, the print command saving determining unit 302 performs the following processing. That is to say, the print command saving determining unit 302 determines whether or not the print command 207 for the next page can be saved in the print command saving unit 303 based on the free space in the print command saving unit 303 (step S1306). In step S1306, determination can be made as to whether or not there is more free space than the size of print commands 207 of the current page, and whether or not there is somewhat greater free space than the size of the print commands 207 of the current page.

As a result of such determination in step S1306, in the case that the print commands 207 of the next page can be saved in the print command saving unit 303, the flow is returned to step S1301, and processing is performed for the next page and thereafter.

On the other hand, in the case that the print commands 207 of the next page cannot be saved in the print command saving unit 303, the print command saving determining unit 302 performs processing for the next page and thereafter, after performing processing to delete any unnecessary print commands 207 that have already been saved. The processing to delete the unnecessary print commands 207 is executed in steps S1307 through S1310. Note that the processing herein may be called out with a timing that saving the print commands 207 in step S1302 has failed.

As the processing to delete the unnecessary print commands 207, first the print command saving determining unit 302 searches for the print commands 207 of the pages corresponding to the greatest parameter Tp out of the already-saved print commands 207 (step S1307). In the case of processing a certain page, the parameter Tp indicates a time that the generating processing of the print commands 207 can be performed in advance of the printing processing of the printer 115. Accordingly, the page corresponding to the greatest parameter Tp is the page having the greatest temporal margin to generate the print commands 207. Accordingly, the print command saving determining unit 302 deletes the searched print command 207 and performs storage control (step S1308).

In the case of deleting print commands 207 of an identified page, the print commands 207 of the pages before and after thereof have a higher priority for saving as compared to other print commands 207. As described in the first embodiment, with the printing processing of the second copy and thereafter, the generating and transferring of the print commands 207 are operated in parallel. Accordingly, the print commands 207 should be saved so that the page spacing is as uniform as possible. That is to say, in the case that the parameter Tp is the same for all pages, it is desirable for the page spacing to save the print commands 207 to finally be uniform. Therefore, with the pages before and after the pages of the deleted print commands 207, the priority order as a subject for deleting is lowered.

In order to reflect this, the print command saving determining unit 302 corrects the parameter Tp corresponding to the pages before and after the page of which the print commands 207 are deleted (step S1309). Let us say that the range of pages to correct the parameter Tp is the pages (Pall/Psave/2) before and after the pages of which the print commands are deleted. Thus, Pall indicates the total number of pages in a job. Psave indicates the number of pages of which the print commands 207 are saved, but print command saving unit 303 is full at the point in time that this calculation is performed, so Psave can also indicate the number of savable pages. In the case of saving the print commands 207 with the (Pall/Psave) page spacing, the print commands 207 can be saved so that the page spacing is uniform. Thus, according to the present embodiment, the print commands 207 are deleted so that the page spacing is as uniform as possible, by adjusting the parameter Tp corresponding to the pages (Pall/Psave/2) before and after the pages of which the print commands 207 are deleted.

Thus, the print command saving determining unit 302 performs adjustment with a method such as reducing the value of the parameter Tp by a fixed value. However, the method of reducing the value of the parameter Tp is not limited to this. For example, a value that becomes smaller the farther away from the page thereof may be subtracted from the parameter Tp, such as a normal distribution with the page with deleted print commands 207 is the center thereof. Lastly, the print command saving determining unit 302 has deleted one page worth of print commands 207, so 1 is subtracted from the number of pages Psave that the print commands 207 are saved (step S1310).

Thus, the processing to delete the unnecessary print commands 207 is ended. Processing to delete the unnecessary print commands 207 (steps S1306 through S1310) is repeated until the print commands 207 of the next page can be saved.

Saving the print commands 207 for each page and deleting the unnecessary print commands 207 are repeated until there are no more remaining pages. The print commands 207 of the pages remaining at the end without being deleted are the print commands 207 finally saved in the printing processing for the first copy.

The printing processing for the second copy and thereafter can be performed the same as the processing shown in FIG. 5. That is to say, with the pages wherein the print commands 207 have already been saved, the print commands 207 thereof are reused and transmitted to the printer 115, and with the pages wherein the print commands 207 are not yet saved, the print commands 207 are generated again and transmitted to the printer 115.

According to the present embodiment, similar to the third embodiment, the print commands 207 are saved so as to use up the usable capacity of the print command saving unit 303 in the state that the printing processing for the first copy has ended. Therefore, the schematics of an example of the basic operations of the present embodiment are as shown in FIG. 12, similar to the third embodiment.

According to the present embodiment, at the time that the printing processing of the first copy is completed, saving the print commands 207 for five pages is completed. The pages determined to be actually saved is changed according to the adjusting in step S1309, but determination is made as shown in FIG. 12 that the number of pages to save the print commands 207 is greater with the fifth through ninth pages which have a high generating burden of print commands 207, and less with the other pages. As shown in FIG. 12, the "generating processing time of the print commands 207" according to the printing processing for the second copy is shorter than the maximum (shortest) printing time of the printer 115, and generating of the print commands 207 is completed by the time all of the pages have completed printing. As a result, with the printing processing for the second copy and thereafter, all of the pages can be printed with the maximum printing time of the printer 115.

Also, according to the present embodiment, the print commands 207 continue to be saved in the storage device of the print command saving unit 303 until determination is made that the print commands 207 cannot be saved. Thus, the print commands 207 are saved in a capable range, regardless of available generating time for the print commands 207, which is a feature of the present embodiment.

Note that in the above-described embodiments, the print commands 207 once generated is saved in the storage device, and reused in the event of a printing request for the same page. Thus, the print commands 207 normally indicate a rendering command that can be interpreted by the printer 115. However, from the perspective of the size or burden distribution in the event of saving, the data in the process of generating the print commands 207 may be saved in the storage device. In this case, after reading the data from the storage device, the remaining processing is completed and print commands 207 are generated, and the generated print commands 207 are supplied to the printer 115.

Other Embodiments of the Present Invention

Various units making up the printing control apparatus according to the embodiments of the present invention and the various steps of the printing control methods described above can be realized by a program operating that is stored in RAM or ROM of a computer. The program and a computer-readable recording medium wherein the program is recorded are included in the present invention.

Also, the present invention can have embodiments serving as a system, apparatus, method, program, or recording medium, and specifically may be applied to a system made up of multiple devices or may be applicable to an apparatus made up of one device.

Note that the present invention includes a configuration wherein a software program to realize the functions of the embodiments described above (program corresponding to the flowcharts shown in FIGS. 4, 5, 7, 9, 11, and 13 according to the embodiments) is supplied directly to a system or apparatus, or supplied from a distance. A case wherein a computer of the system or apparatus thereof reads and executes the supplied program code is also included in the present invention.

Accordingly, in order to realize the function processing of the present invention with a computer, the program code itself that is installed in the computer also realizes the present invention. That is to say, the present invention includes the computer program itself in order to realize the function processing of the present invention. In this case, as long as the program code has the functions of the program, an object code, program executed by an interpreter, script data supplied to the OS and so forth may be used.

A recording medium to supply the program may be, for example, a floppy disk, hard disk, optical disc (CD-ROM, CD-R, CD-RW, DVD (DVD-ROM, DVD-R)), magneto-optical disk (MO), ROM, and so forth. Also, magnetic tape, non-volatile memory card, ROM, and so forth may be used.

As for a supply method of the program, a browser of a client computer may be used to connect to a website on the Internet. The computer program itself of the present invention, or a file that is compressed and includes an automatic installation function, can be supplied by being downloaded from the website onto a recording medium such as a hard disk or the like.

Also, the program code making up the program of the present invention can be divided into multiple files and each file may be downloaded from different websites. That is to say, a WWW server that downloads a program file to realize the function processing of the present invention with a computer to multiple users is also included in the present invention.

Also, the program of the present invention may be encrypted, stored in a storage medium such as a CD-ROM, and distributed to users, and key information to decrypt is downloaded from a website via the Internet by users having cleared predetermined conditions. Using the downloaded key information, executing the encrypted program and installing the program in a computer can also realize the present invention.

Also, the functions of the embodiments described above can be realized by a computer executing the read program. Also, based on instructions of the program thereof, and OS or the like operating on the computer can perform a portion or all of the actual processing, and the functions of the embodiments described above can be realized by such processing also.

Further, the program read from the recording medium can be written into memory of a function expansion board installed in a computer or a function expansion unit connected to a computer. Thereafter, based on the program instructions thereof, a CPU or the like associated with the function expansion board or function expansion unit can perform a portion or all of the actual processing, and the functions of the embodiments described above can be realized by such processing also.

Note that the various embodiments described above only illustrate specific examples of realizing the present invention, and the technical scope of the present invention is not to be limited by these examples. That is to say, the present invention can be realized in various forms within the scope of the technical concepts and the main features thereof.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2008-193992 filed Jul. 28, 2008, which is hereby incorporated by reference herein in its entirety.

What is claimed is:

1. A method in a printing system which includes a storage device for supplying print commands used in printing with a printer based on a printing request to instruct a plurality of pages and a plurality of copies, said method comprising the steps of:

generating print commands based on said printing request;

obtaining estimated printing time of a page unit by said printer;

measuring the generating time of the print commands of the page unit in said generating step;

first determining first print commands of a page to be stored in said storage device by using said estimated printing time and said generating time;

second determining print commands that differ from the first print commands determined in said first determining step as second print commands of a page to be stored in said storage device;

storing the first and second print commands determined in said first and second determining step;

supplying said print commands to said printer; and calculating an adjusting parameter to adjust frequency of storing a print command in said storage device by using a storage capacity of said storage device, a size of print commands stored in said storage device and a number of pages included in the printing request, wherein generating of the print commands in said generating step and supplying the print commands to the printer in said supplying step are performed in parallel, wherein the print commands to be stored in said storage device is determined in the first determining step by using said estimated printing time and the generating time which has been adjusted based on the calculated adjusting parameter, wherein, in a printing process for a second one of the plurality of copies, the print commands stored in said storage device are supplied to the printer without generating the print commands in said generating step, and wherein the pages corresponding to the first and second print commands are different from each other.

2. The method according to claim 1, further comprising the step of:

adjusting the size of print commands stored in said storing step so as to be within a storage capacity for storing the print commands in said storage device.

3. The method according to claim 2, wherein in said adjusting step, in the case that the total size of print commands of the pages determined in said first and second determining step exceeds said storage capacity, the print commands of the pages determined in said first determining step are adjusted so as to be prioritized and stored in said storage device.

4. The method according to claim 1, wherein in said obtaining step, a lookup table that returns a processing time based on printing mode of the printer is referenced, and said estimated printing time is obtained.

5. The method according to claim 4, wherein in said obtaining step, said lookup table further based on sheet size for printing by the printer is referenced, and said estimated printing time is obtained.

6. The method according to claim 1, wherein in said obtaining step, said estimated printing time is obtained based on the state of supplying the print commands as to the printer.

7. The method according to claim 1, wherein in said obtaining step, said estimated printing time is calculated based on the information obtained from the printer.

8. The method according to claim 1, wherein in said first determining step, based on said generating time and said estimated printing time, the print commands of the pages delaying supply of the print commands in said supplying step by page generation in said generating step are determined to be stored in said storage device.

9. The method according to claim 1, wherein in said second determining step, in the case that the total size of print commands of the pages determined in said first determining step does not fill a storage capacity for storing the print commands in said storage device, print commands of pages different from the print commands of the pages determined in said first determining step are determined as print commands that should be stored.

10. The method according to claim 1, wherein in said second determining step, the print commands of pages other than the print commands of the pages determined in said first determining step are determined to be stored at predetermined page spacing.

11. A non-transitory computer readable storage medium on which is stored a computer program for causing a computer to execute a method for supplying print commands used in printing with the printer, based on printing requests specifying a plurality of pages and a plurality of copies, said method comprising the steps of:

generating print commands based on said printing request;

obtaining estimated printing time of a page unit by said printer;

measuring the generating time of the print commands of the page unit in said generating step;

first determining first print commands of a page to be stored in a storage device by using said estimated printing time and said generating time;

second determining print commands that differ from the first print commands determined in said first determining step, as second print commands of a page to be stored in said storage device;

storing the first and second print commands determined in said first and second determining step;

supplying said print commands to said printer; and calculating an adjusting parameter to adjust frequency of storing a print command in said storage device by using a storage capacity of said storage device, a size of print commands stored in said storage device and a number of pages included in the printing request, wherein generating of the print commands in said generating step and supplying the print commands to said printer in said supplying step are performed in parallel, wherein the print commands to be stored in said storage device is determined in the first determining step by using said estimated printing time and the generating time which has been adjusted based on the calculated adjusting parameter, wherein, in a printing process for a second one of the plurality of copies, the print commands stored in said storage device are supplied to the printer without generating the print commands in said generating step, and wherein the pages corresponding to the first and second print commands are different from each other.

12. A printing control apparatus which includes a storage device for supplying print commands used in printing with a printer based on a printing request to instruct a plurality of pages and a plurality of copies, comprising:
- a generating unit configured to generate print commands based on said printing request;
- an obtaining unit configured to obtain estimated printing time of a page unit by said printer;
- a measuring unit configured to measure the generating time of the print commands of page unit by said generating unit;
- a first determining unit configured to determine first print commands of a page to be stored in said storage device by using said estimated printing time and the generating time measured by said measuring unit;
- a second determining unit configured to determine print commands that differ from the first print commands determined by said first determining unit, as second print commands of a page to be stored in said storage device;
- a storing unit configured to store the first and second print commands determined by said first and second determining unit;
- a supplying unit configured to supply said print commands to said printer; and
- a calculating unit configured to calculate an adjusting parameter to adjust frequency of storing a print command in said storage device by using a storage capacity of said storage device, a size of print commands stored in said storage device and a number of pages included in the printing request, wherein generating of the print commands by said generating unit and supplying the print commands to the printer by said supplying unit are performed in parallel, wherein the print commands to be stored in said storage device is determined in the first determining step by using said estimated printing time and the generating time which has been adjusted based on the calculated adjusting parameter, wherein, in a printing process for a second one of the plurality of copies, said supplying unit supplies print commands stored in said storage device to the printer without generating the print commands, and wherein the pages corresponding to the first and second print commands are different from each other.

13. The printing control apparatus according to claim 12, further comprising an adjusting unit configured to adjust the size of print commands stored by said storing unit so as to be within a storage capacity for storing the print commands in said storage device, and
herein the print commands of the pages determined by said first determining step so as to be prioritized and stored in said storage device in the case that the total size of print commands of the pages determined by said first and second determining unit exceeds said storage capacity.

14. The printing control apparatus according to claim 12, wherein said obtaining unit obtains said estimated printing time based on the state of supplying the print commands to the printer.

15. The printing control apparatus according to claim 12, wherein said obtaining unit calculates said estimated printing time based on the information obtained from the printer.

16. The printing control apparatus according to claim 12, wherein said first determining unit, based on said generating time and said estimated printing time, determines that the print commands of the pages delaying supply of the print commands of said supplying unit by page generation of said generating unit should be stored in said storage device.

17. The printing control apparatus according to claim 12, wherein said second determining unit determines, in the case that the total size of print commands of the pages determined by said first determining unit does not fill a storage capacity for storing the print commands in said storage device, prints commands of pages different from the print commands of the pages determined by said first determining unit as print commands of a page to be stored in said storage device.

* * * * *